United States Patent
Anderholm et al.

(10) Patent No.: US 11,087,610 B2
(45) Date of Patent: Aug. 10, 2021

(54) PRESENCE DETECTION AND USES THEREOF

(71) Applicant: Avigilon Corporation, Vancouver (CA)

(72) Inventors: Peter Anderholm, Newburyport, MA (US); Yanyan Hu, Woburn, MA (US); Kevin Piette, Melrose, MA (US); Pietro Russo, Melrose, MA (US); Bo Yang Yu, Winchester, MA (US)

(73) Assignee: AVIGILON CORPORATION, Vancouver (CA)

(*) Notice: Subject to any disclaimer, the term of this patent is extended or adjusted under 35 U.S.C. 154(b) by 0 days.

(21) Appl. No.: 16/199,107

(22) Filed: Nov. 23, 2018

(65) Prior Publication Data

US 2019/0096220 A1    Mar. 28, 2019

Related U.S. Application Data

(63) Continuation-in-part of application No. 15/725,218, filed on Oct. 4, 2017, now Pat. No. 10,460,582, which
(Continued)

(51) Int. Cl.
| | |
|---|---|
| *G01S 13/04* | (2006.01) |
| *G08B 21/04* | (2006.01) |
| *G07F 19/00* | (2006.01) |
| *G06K 9/00* | (2006.01) |
| *G08B 21/02* | (2006.01) |

(Continued)

(52) U.S. Cl.
CPC .......... *G08B 21/0476* (2013.01); *G01S 13/04* (2013.01); *G01S 13/867* (2013.01); *G01S 13/886* (2013.01); *G06K 9/00369* (2013.01); *G07F 19/207* (2013.01); *G08B 13/181* (2013.01); *G08B 13/19613* (2013.01);
(Continued)

(58) Field of Classification Search
CPC ............... G08B 21/0476; G08B 21/22; G08B 13/19695
See application file for complete search history.

(56) References Cited

U.S. PATENT DOCUMENTS

| | | | |
|---|---|---|---|
| 6,307,475 B1 | 10/2001 | Kelley | |
| 6,859,164 B2 * | 2/2005 | Kurita | G01S 7/4021 342/104 |

(Continued)

FOREIGN PATENT DOCUMENTS

| | | |
|---|---|---|
| TW | 201621830 A | 6/2016 |
| WO | 2008/001092 | 1/2008 |

OTHER PUBLICATIONS

"Orbbec," Oct. 26, 2016, <http://orbbec3d.com/>.
(Continued)

*Primary Examiner* — Qutbuddin Ghulamali
(74) *Attorney, Agent, or Firm* — Perry + Currier, Inc.

(57) ABSTRACT

A computer-implemented method comprises detecting, with a presence detector such as a radar device, a presence of a person at a location such as an ATM vestibule. In response thereto, a timer is initiated. After initiating the timer, a portal sensor is used to detect a change in a status of a portal permitting access to the location. In response thereto, the timer is adjusted (for example the timer is reset). Thus, multiple consecutive normal usages of the vestibule do not unnecessarily trigger an alarm.

18 Claims, 31 Drawing Sheets

Related U.S. Application Data is a continuation of application No. PCT/CA2017/051179, filed on Oct. 3, 2017.

(60) Provisional application No. 62/477,195, filed on Mar. 27, 2017, provisional application No. 62/404,124, filed on Oct. 4, 2016.

(51) Int. Cl.
*G01S 13/88* (2006.01)
*G08B 13/196* (2006.01)
*G08B 13/181* (2006.01)
*G01S 13/86* (2006.01)
*G08B 25/10* (2006.01)
*G08B 21/22* (2006.01)

(52) U.S. Cl.
CPC ....... *G08B 21/025* (2013.01); *G08B 21/0492* (2013.01); *G08B 25/10* (2013.01); *G08B 21/22* (2013.01)

(56) References Cited

U.S. PATENT DOCUMENTS

| | | | |
|---|---|---|---|
| 8,740,793 B2 | 6/2014 | Cuddihy et al. | |
| 9,052,871 B2 | 6/2015 | Lapstun et al. | |
| 9,396,400 B1 | 7/2016 | Teichman et al. | |
| 9,396,447 B2* | 7/2016 | Dalley, Jr. | G08B 13/2451 |
| 2002/0067259 A1* | 6/2002 | Fufidio | G08B 13/183 |
| | | | 340/541 |
| 2005/0068169 A1* | 3/2005 | Copley | G08B 21/0283 |
| | | | 340/539.13 |
| 2006/0061504 A1 | 3/2006 | Leach et al. | |
| 2006/0075091 A1* | 4/2006 | Beyda | H04L 69/329 |
| | | | 709/224 |
| 2010/0013640 A1 | 1/2010 | Greene | |
| 2010/0214413 A1 | 8/2010 | Lin et al. | |
| 2012/0154155 A1* | 6/2012 | Brasch | G08B 21/22 |
| | | | 340/573.4 |
| 2013/0182904 A1 | 7/2013 | Zhang et al. | |
| 2016/0025846 A1 | 1/2016 | Mostov | |
| 2016/0109566 A1 | 4/2016 | Lin et al. | |
| 2016/0140397 A1 | 5/2016 | Zhang et al. | |
| 2016/0170017 A1* | 6/2016 | Ho | G01S 7/415 |
| | | | 342/53 |
| 2016/0356880 A1* | 12/2016 | Negussu | G01S 7/022 |
| 2017/0299718 A1* | 10/2017 | Kydar | G01S 7/003 |
| 2017/0328997 A1* | 11/2017 | Silverstein | G01S 13/87 |

OTHER PUBLICATIONS

"End to End Simplicity," Jun. 4, 2016, <http://matterport.com:80/how-it-works/>.

"Asus," Oct. 28, 2016, <http://www.assus.com/3D-sensor/Xtion/>.

Metrilus, "Research in Germany," 2014, pp. 8, <http://www.ti.com/lsds/media/documents/3d-imaging .. ./24128_Metrilus_Brochure_EN.pdf>.

"8C. Changing Rooms and Showers with a Combination Detector," Aug. 20, 2010, <http://www.extronic.se/narvaro/en/8c/>.

SmartSensor HD, Sep. 16, 2012, 16 pages, <http://www.signalcontrol.com/products/wavetronix/,vavetronix _smartsensor _ hd _ 126.pdf>.

Jason Mick, "Police are Using New Handheld Radar Sendors to Peer into Houses w/out Warrant," Jan. 20, 2015, <http://www.dailytech.com/Police+are+Using+New+Handheld+Radar+Sensors+to+Peer+Into+Houses+wout+Warrant/article37088.htm>.

International Search Report for corresponding International Application No. PCT/CA2017/051179 dated Jan. 25, 2018.

\* cited by examiner

| 01C | 4 occupants; 3 sleeping; 1 active |
| 02C | 4 occupants; 4 sleeping |
| 03C | 2 occupants; 2 sleeping |
| ... | ... |
| 18C | 4 occupants; 4 sleeping |
| H | 1 occupants; 1 active |

FIG. 25

PRESENCE DETECTION AND USES THEREOF

RELATED APPLICATIONS

This application is a continuation-in-part (CIP) of U.S. application Ser. No. 15/725,218 filed on Oct. 4, 2017, which is a continuation of PCT International Application No. PCT/CA2017051179 filed on Oct. 3, 2017, claims the benefit of U.S. Provisional Patent Application No. 62/477,195 filed on Mar. 27, 2017, and claims the benefit of U.S. Provisional Patent Application No. 62/404,124 filed on Oct. 4, 2016. All of the aforementioned applications are hereby incorporated by reference in their entireties.

FIELD

The present subject-matter relates to a sensor system, camera, and a system integrating the camera and sensor system configured to detect a person.

BACKGROUND

A camera may be used to acquire information about a place or an object. The information is visual image data generated by the camera corresponding to the scene falling with the field of view of the camera. A sensor system, such as a radar or depth device, may be used to acquire other information about a place or an object.

Some currently available security systems include means of detecting loitering, often based on tracking the movement of an object within a fixed area for a period of time. However typical video analytics systems fail to detect an immobile person, who simply becomes part of the background image. Security systems available are unable to detect sleeping persons as they do not move sufficiently to register on a camera system; instead they are treated like immobile objects. This poses problems in situations in which the object being monitored is at rest and moving only minimally. An example of such a situation occurs in certain areas, such as ATM vestibules, which are attractive and relatively warm areas for sleeping compared to the outdoors.

Currently banks and other operators of publicly accessible areas, for example ATM vestibules, have difficulty detecting and moving sleeping persons from their property. The presence of persons loitering or sleeping in a vestibule may discourage customers from entering the vestibule.

Another challenge for video cameras is detecting objects or persons in multiple rooms, or in situations where privacy needs to be protected, for example changing rooms or showers.

SUMMARY

In a first aspect of the disclosure, there is provided a computer-implemented method comprising: detecting a presence of a person at a location; in response thereto, initiating a timer; after initiating the timer, detecting a change in a status of a portal permitting access to the location; and in response thereto, adjusting the timer.

Adjusting the timer may comprise pausing the timer for a predetermined period of time, or resetting and reinitiating the timer.

Detecting the change in the status of the portal may comprise determining that the status has changed from a closed status to an open status.

Detecting the presence of the person may comprise using radar to detect the presence of the person.

Detecting the presence of the person may comprise using a camera to detect the presence of the person.

The method may further comprise, after adjusting the timer: determining that the timer has expired; and further detecting a presence of a person at the location.

The method may further comprise, in response to determining that the timer has expired or in response to further detecting the presence of the person at the location, issuing an instruction for performing an action associated with abnormal usage at the location.

Issuing the notification may comprise one or more of: activating a visual alarm; activating an audible alarm; and controlling a camera at the location.

The method may further comprise, after adjusting the timer: determining that the timer has expired; and determining that no person is present at the location.

The method may further comprise, in response to determining that the timer has expired or in response to determining that no person is present at the location, resetting the timer.

Resetting the timer may comprise resetting the timer after a cool-down period has elapsed since determining that the timer has expired.

The method may further comprise, after determining that the timer has expired and after determining that no person is present at the location: further detecting during a cool-down period a presence of a person at the location, wherein the cool-down period comprises a period of time immediately following the determining that the timer has expired; and in response thereto, issuing an instruction for performing an action associated with abnormal usage at the location.

The location may comprise one or more of: an Automatic Teller Machine (ATM) vestibule; a changing room; a bathroom; and a locker room.

In a further aspect of the disclosure, there is provided a system comprising: a timer; a presence detector configured to detect a presence of a person at a location; a portal permitting access to the location; a portal sensor configured to detect a change in a status of the portal; and one or more processors communicative with memory having stored thereon computer program code configured when executed by the one or more processors to cause the one or more processors to perform a method comprising: detecting with the presence detector a presence of a person at the location; in response thereto, initiating the timer; after initiating the timer, detecting with the portal sensor a change in the status of the portal; and in response thereto, adjusting the timer.

The system may comprise any of the features or elements described above in connection with the first aspect of the disclosure.

In a further aspect of the disclosure, there is provided a computer-readable medium having stored thereon computer program code configured when executed by one or more processors to cause the one or more processors to perform a method comprising: detecting a presence of a person at a location; in response thereto, initiating a timer; after initiating the timer, detecting a change in a status of a portal permitting access to the location; and in response thereto, adjusting the timer.

The computer-readable medium may comprise any of the features or elements described above in connection with the first aspect of the disclosure.

Throughout the disclosure, abnormal usage may refer to use of a vestibule or some other location for a duration that is atypical, in other words for a duration that is significantly greater than what would normally be expected for the given location. For example, normal usage of an ATM vestibule may refer to any use not exceeding 10 minutes, whereas abnormal usage of an ATM vestibule may refer to any use exceeding 10 minutes.

BRIEF DESCRIPTION OF THE DRAWINGS

The detailed description refers to the following figures, in which:

FIG. 25 illustrates a display generated by a radar system monitoring a plurality of prison cells, in accordance with embodiments of the disclosure;

Figure 1:
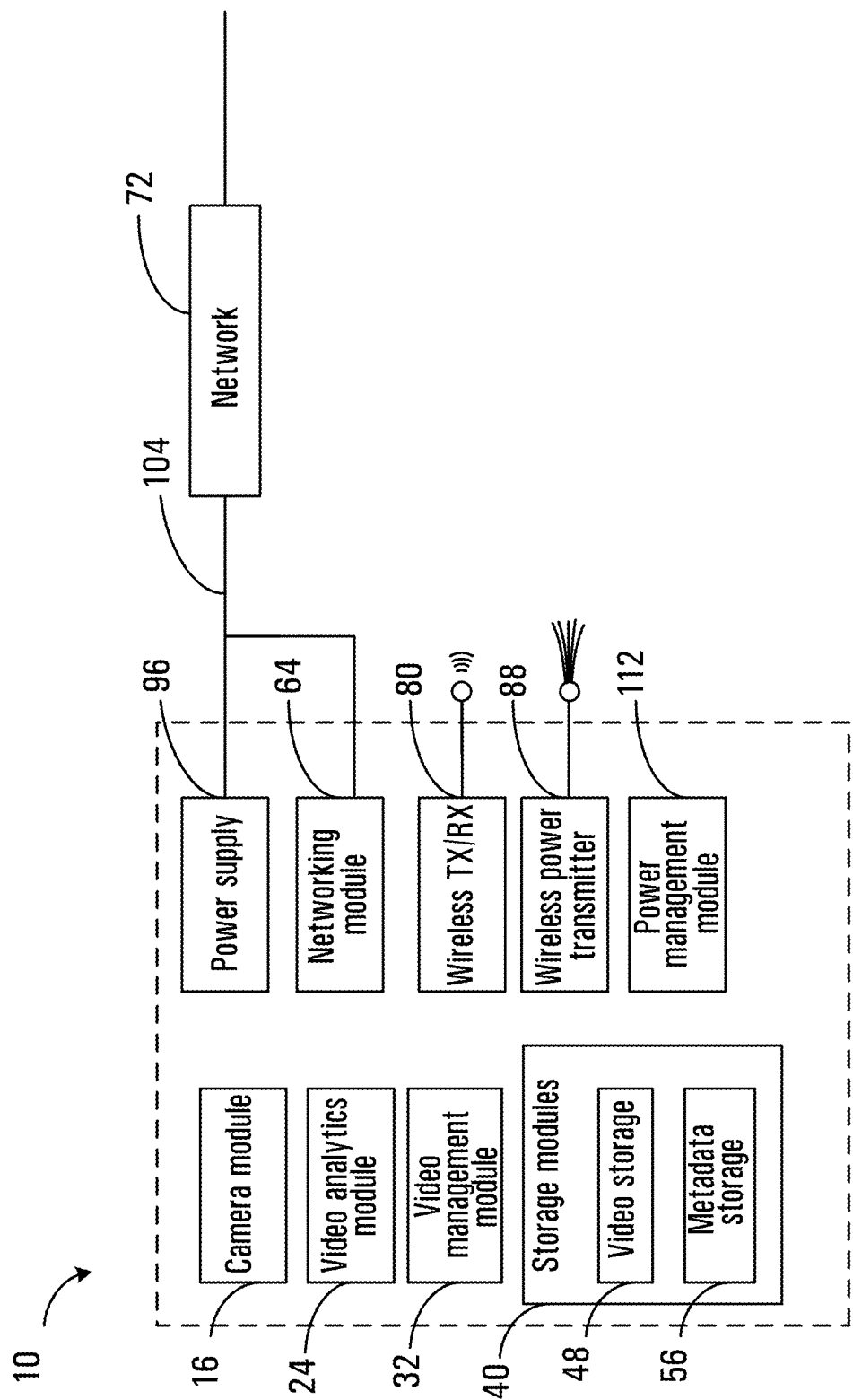
FIG. 1 illustrates a block diagram of a camera device in accordance with embodiments of the disclosure.

It will be appreciated that for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s) are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application is essential or is coextensive, except where it is either expressly stated to be so in this specification or expressly recited in a claim.

"Battery" herein refers to not only a device in which chemical energy is converted into electricity and used as a source of power, it also refers to any alternatively suitable energy storage devices such as, for example, a capacitor of suitable size and construction.

"Image data" herein refers to data produced by a camera device and that represents images captured by the camera device. The image data may include a plurality of sequential image frames, which together form a video captured by the camera device. Each image frame may be represented by a matrix of pixels, each pixel having a pixel image value. For example, the pixel image value may be a numerical value on grayscale (e.g. 0 to 255) or a plurality of numerical values for colored images. Examples of color spaces used to represent pixel image values in image data include RGB, YUV, CYKM, YCbCr 4:2:2, YCbCr 4:2:0 images. It will be understood that "image data" as used herein can refer to "raw" image data produced by the camera device and/or to image data that has undergone some form of processing. It will be further understood that "image data" may refer to image data representing captured visible light in some examples and may refer to image data representing captured depth information and/or thermal information in other examples.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

Referring now to FIG. 1, therein illustrated is a block diagram of a camera device 10 according to an example embodiment. The camera device 10 is illustrated according its operational modules. An operational module of the camera device 10 may be a hardware component. An operational module may also be implemented in hardware, software or combination of both.

The camera device 10 includes one or more processors, one or more memory devices coupled to the processors and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor may be implemented by any processing circuit having one or more circuit units, including a digital signal processor (DSP), graphics processing unit (GPU) embedded processor, vision processing unit (VPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may, for example, include the memory circuit or be in wired communication with the memory circuit.

In various example embodiments, the memory device is communicatively coupled to the processor circuit and is operable to store data and computer program instructions. Typically, the memory device is all or part of a digital electronic integrated circuit or formed from a plurality of digital electronic integrated circuits. The memory device may be implemented as Read-Only Memory (ROM), Programmable, Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device may be implemented together within a system on a chip (SOC). For example, the processor, the memory device and the network interface may be implemented within a SOC. Furthermore, when implemented in this way, both a general purpose processor and DSP may be implemented together within the SOC.

The camera device 10 includes at least one camera module 16 (for convenience of illustration only one is shown in the illustrated example embodiment) that is operable to capture a plurality of images and produce image data representing the plurality of captured images. The camera module 16 generally refers to the combination of hardware and software sub-modules that operate together to capture the plurality of images of a scene. Such sub-modules may include an optical unit (e.g. camera lens) and an image sensor. In the case of a digital camera module, the image sensor may be a CMOS, NMOS, or CCD type image sensor.

The lens and sensor combination defines a field of view. When positioned at a given location and at a given orientation, the camera module 16 is operable to capture the real-life scene falling within the field of view of the camera and to generate image data of the captured scene.

The camera module 16 may perform some processing of captured raw image data, such as compressing or encoding the raw image data.

The camera device 10 may optionally include a video analytics module 24. The video analytics module 24 receives image data from the camera module 16 and analyzes the image data to determine properties or characteristics of the captured image or video and/or of objects found in scene represented by the image or video. Based on the determinations made, the video analytics module 24 may further output metadata providing information about the determinations. Examples of determinations made by the video analytics module 24 may include one or more of foreground/background segmentation, object detection, object tracking, object classification, virtual tripwire, anomaly detection, facial detection, facial recognition, license plate recognition, identifying objects "left behind", monitoring objects (i.e. to protect from stealing), unusual motion, object recognition, and business intelligence. However, it will be understood that other video analytics functions known in the art may also be implemented by the video analytics module 24.

The camera device 10 may optionally include a video management module 32. The video management module 32 receives image data and performs processing functions on the image data related to video transmission, playback and/or storage. For example, the video management module 32 can process the image data to permit transmission of the image data according to bandwidth requirements and/or capacity. The video management module 32 may also process the image data according to playback capabilities of a client device that will be playing back the video, such as processing power and/or resolution of the display of the client device. The video management 32 may also process the image data according to storage capacity in the camera device 10 or in other devices connected to the camera device 10 over a network.

The camera device 10 may optionally include a set 40 of storage modules. For example, and as illustrated, the set 40 of storage modules include a video storage module 48 and a metadata storage module 56. The video storage module 48 stores image data, which may be image data processed by the video management module 32. The metadata storage module 56 stores information data output from the video analytics module 24.

It will be understood that while video storage module 48 and metadata storage module 56 are illustrated as separate modules, they may be implemented within a same hardware storage device whereby logical rules are implemented to separate stored video from stored metadata. In other example embodiments, the video storage module 48 and/or the metadata storage module 56 may be implemented within a plurality of hardware storage devices in which a distributed storage scheme may be implemented.

The storage modules 48, 56 provide non-transitory storage of image data and/or metadata. In other example embodiments wherein storage modules 48, 56 are not provided, image data generated by the camera module 16 and metadata generated by the video analytics module 24 may be immediately transmitted to an external device over a network.

The camera device 10 includes a networking module 64 operable for providing data communication with another device over a network 72. The network 72 may be a local area network, an external network (e.g. WAN, Internet) or a combination thereof. In other examples, the network 72 may include a cloud network.

The camera device 10 further includes a transceiver 80 operable for communicating wirelessly with another device. The wireless communication may be provided according to any protocol known in the art, such as Bluetooth, Wi-Fi, ZigBee or cellular communication. Alternatively, camera device 10 may be operable for communicating over a wire with another device.

In some examples, the transceiver 80 is a short-range, low-power transceiver. A short-range, low-power transceiver may be useful for reducing power consumption of the external device with which the camera device 10 is communicating. For example, the transceiver 80 that is short-range may have a communication range of less than about 10 meters. For example, the transceiver 80 that is low-power may have a power consumption of less than about 0.5 Watts. A short-range, low-power transceiver may implement a low-energy Bluetooth or low-energy Wi-Fi protocol known in the art.

The camera device 10 further includes a wireless power transmitter 88 that is operable for transmitting power wirelessly to an external electrical load. The external electrical load may be an energy storage device, such as at least one battery or capacitor. For example, power may be transferred by magnetic fields in which one or more coils of wires in the wireless power transmitter 88 is coupled by magnetic induction with a cooperating coil in the external device that is being powered by the wireless power. The inductive coupling between the wireless power transmitter 88 and a cooperating device receiving the power may be resonant inductive coupling or electrodynamic induction. It will be understood that the wireless power transmission is not limited to non-radiative techniques. In some examples, longer range techniques may be used, such as power beaming based on microwaves or lasers.

The camera device 10 further includes a power supply 96 operable for supplying electrical power to the hardware components of the camera device 10, such as those implementing the camera module 16, transceiver 80, networking module 64 and wireless power transmitter 88.

In some examples, the power supply 96 receives electrical power from a power source over a wired connection. The power source may be mains electricity (ex: 110V/220V AC), which may be converted to a supply suitable for the camera device 10 (ex: converting to DC, rectifying to a lower voltage). In some alternative examples, the power source may be an intermediate device that supplies power in addition to performing another function, such as processing or networking. In yet further alternative examples, the power supply may be supplying power in a sustainable manner based on, for instance, solar power technology or power received wirelessly from another device in communication with the camera device 10.

In one example embodiment, power may be supplied to the power supply 96 over a connection that is also providing data communication. For example, power may be supplied to the power supply 96 by power over Ethernet (POE), wherein the cable connected to the networking module 64 for network data communication is also used for supplying power to the power supply. As illustrated, the same cable 104 that is connected to the network (e.g. connected to a network switch or router) is also connected to the power supply 96.

The camera device 10 may further include a power management module 112 that is operable for managing the supply of power from the power supply 96 to various hardware components of the camera device 10. The power management module 112 may manage the power being consumed by the wireless power transmitter 88 separately from management of power being consumed by other components of the camera device 10. The power management module 112 may further control the priority of providing power to various modules of the camera device 10. This prioritization in the case of high power demand from various modules, which may otherwise cause system overload.

For example, a wireless power transmitter power management submodule may control the power level of the wireless power transmitted from the wireless power transmitter 88. The power level may be varied according to characteristics of an external device receiving the wireless power. Such characteristics may include one or more of the distance of the external device from the camera device 10, the average power requirement of the external device, the instantaneous power requirement of the external device, and the current battery status of the external device.

The power level may also be varied according to environmental factors, such as time of day, location, and number of proximately located devices. For example, where the camera device 10 is used for charging the external device, the wireless power transmitter power management submodule may choose to transmit wireless power for charging during off-peak hours.

The power level may also be varied according to power load requirements from other components of the camera device 10. For example, during periods when other components of the camera device 10 experience heavy load, the power management module 112 may supply less or no power to the wireless power transmitter. These periods may occur when the camera device 10 has to handle a large amounts of data, such as transferring or backing up data stored within the storage module 40.

The example camera device 10 is suitable for use in conjunction with an external device that requires data communication with another device over a network and that would benefit from receiving wirelessly transmitted power. The camera device 10 can provide network connectivity to the external device via data communication provided between the wireless transceiver 80 of the camera device 10 and a corresponding wireless transceiver of the external device. The network connectivity is further provided through the connection of the networking module 64 of the camera device 10 with the network 72. Accordingly, the external device may be in communication another network node connected to the network 72 only via the camera device 10 and without requiring some form of wired and/or wireless connection from the external device to the network 72.

The camera device 10 can further provide a continued power source for the external device via wireless power transmitter 88 transmitting power to the external device. The external device may be battery-operated and the power transmitted wirelessly from the camera device 10 may be used to charge at least one battery of the external device. Accordingly, the external device may operate without having to receive power over a wired power cable. Furthermore, even where the external device may be fully battery-operated, the providing of wireless power from the camera device 10 to the external device to charge the battery of the external device may eliminate, or reduce the frequency, of having to change the battery.

In some example embodiments, the power output from the wireless power transmitter 88 may be variably controlled. For example, the level of power output may be adjusted according to the power consumption of the external device receiving the wirelessly transmitted power. The level of power out may also be adjusted based on one or more parameters of the deployment of the camera device 10 with the external device, such as the distance there between. The power output from the wireless power transmitter 88 may be adjusted so that the level of wireless power received at the external device corresponds with a power requirement of the external device, such as an average power requirement of the external device. The power output may also be adjusted based on a change in power requirement of the external device. However, the power output from the wireless power transmitter 88 may be throttled by the power management module 112 to ensure continued proper functioning of the camera device 10. In some example embodiments, the wireless power transmitter 88 may implement trickle charging or slow charging of the external device.

In some example embodiments, the wireless power transmitter 88 may be chosen to provide at least 3 watts power to a power-receiving external device located at a distance of at most 10 meters from the camera device 10. For example, such a power output would effectively charge a depth sensor, radar sensor, or typical PIR motion sensor.

In other example embodiments, the wireless power transmitter 88 may be chosen to provide substantially less power, such as about 0.2 mW of power at a distance of at most 10 meters from the camera device 10. This level of power output is suitable for external devices that are typically on standby, such as a smoke alarm.

Figure 2:
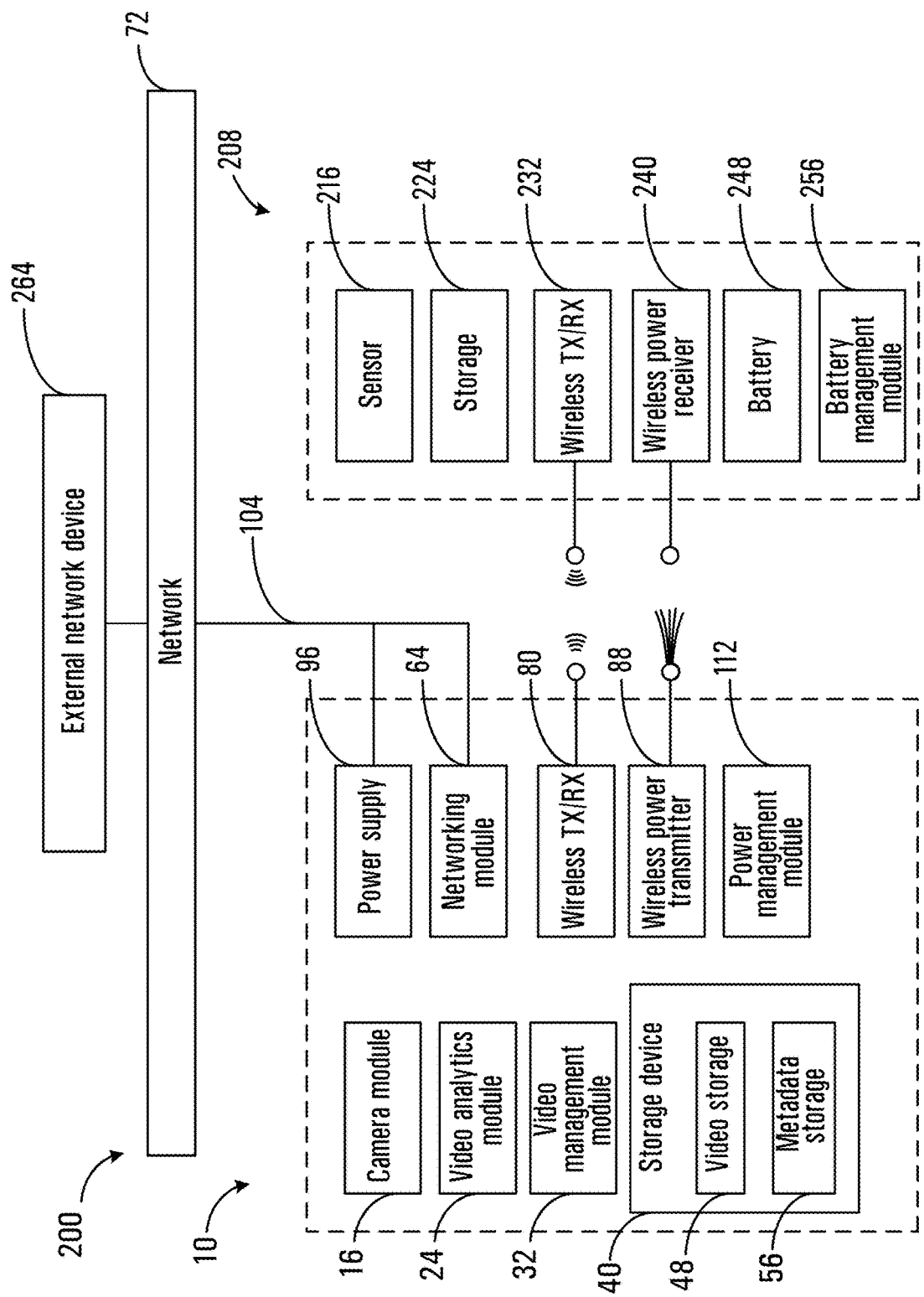
FIG. 2 illustrates a block diagram of a combined system having an example camera device and a sensor system, in accordance with embodiments of the disclosure.

Referring now to FIG. 2, therein illustrated is a block diagram of a combined system 200 according to one example embodiment having a camera device 10 and a sensor system 208.

The sensor system 208 may be a radar sensor, a depth sensor, or both, as described below. Sensor system 208 includes a sensor 216.

The sensor system 208 may include a storage module 224. The storage module 224 may be operatively connected with sensor 216 to receive sensed signals and store the sensed signals. The storage module 224 may also store one or more sensing rules. The sensor 216 may implement sensing based on applicable sensing rules. For example, the rules may cause the sensor 216 to cease sensing during given periods of the day, for example during daylight, and carry out sensing at other periods of the day, for example during the night, when persons are most likely to be loitering or sleeping in an ATM vestibule.

The sensor system 208 includes a communications transceiver 232 operable for providing data communication with the camera device 10 via the transceiver 80. The communications transceiver 232 of the sensor system 208 may implement a wireless communication protocol that is compatible with the communication protocol implemented by the transceiver 80 of the camera device 10. For example, the communications transceiver 232 may also be a short-range, low-power transceiver.

Sensed signals generated by the sensor 216 can be transmitted from sensor system 208 using its communications transceiver 232 and received at the camera device 10 using its transceiver 80. The sensed data may be further transmitted to external network device 264 from the camera device 10 over the network 72.

The sensor system 208 may further receive commands from the camera device 10. The commands may have been initially transmitted from the external network device 264 to the camera device 10 via the network 72 and the networking module 210 of the camera 10. For example, the commands may be for controlling the sensor system 208, such as commands for changing sensing rules applied to the sensor system 208.

The sensor system 208 further includes a wireless power receiver 240 that is operable for receiving power transmitted wirelessly from the wireless power transmitter 88 of the camera device 10. The wireless power receiver 240 is configured to be compatible with the wireless power transmitter 88 of the camera device 10. For example, the wireless power receiver 240 includes one or more coil of wires in which a flow of electrical current is induced by the wireless power transmitted from the camera device 10.

The sensor system 208 may further include at least one battery 248 or other suitable form of power storage device for supplying power to one or more components of the sensor system 208. The at least one battery 248 may supply power to the sensor 216, and the communications transceiver 232. The at least one battery 248 is rechargeable using power transmitted wirelessly from the camera device 10 and received by the wireless power receiver 240.

The sensor system 208 may further include a battery management module 256. The battery management module 256 operates to manage charging of the at least one battery 248 using the power received by the wireless power receiver 240.

In one example embodiment, the battery management module 256 may sense the charge level of the at least one battery 248 and implements charging of the battery 248 when the charge level falls below a predetermined level.

In another example embodiment, the battery management module 256 may implement charging of the battery 248 any time wireless power is available from the wireless power receiver 240. The battery management module 256 may be further operable to implement trickle charging or slow charging of the battery 248.

In yet another example embodiment, the battery management module 256 may be further operable to sense the battery charge level and to communicate the charge level to the camera device 10 using the wireless transceiver 232. The camera device 10 may be configured to transmit wireless power only when it receives an indication that the charge level of the at least one battery 248 of the radar device 208 has fallen below a predetermined level. Additionally, or alternatively, the battery management module 256 may transmit, using the wireless transceiver 232, a request to the camera device 10 to begin wireless transmission of power to the sensing device so that the power can be used for charging the at least one battery.

Continuing with FIG. 2, the camera device 10 is operable to transmit over the network 72 sensed signals received from the sensor system 208. Accordingly, the camera device 10 acts as a gateway to the network 72 for the sensor system 208. The camera device 10 may transmit the image data and the sensed data to their respective destinations over the network 72.

In various example embodiments, the camera device 10 may be configured to transmit the sensed signals received from the sensor system 208 to the external network device 264 over the network 72. For example, the external network device 264 may be a server that processes or manages the image data and/or the sensed signals. When being transmitted to the same destination networked device, image data that is captured by the camera module 16 at a given time is logically associated with sensed signals pertaining to one or more conditions sensed by the sensor 216 at the same time. "Logically associated" herein refers to an association in which knowledge of the relevant image data allows retrieval of its logically associated sensed signals and vice versa. For example, the image data and its corresponding signal may both include a time stamp, which provides the logical association.

According to various example embodiments wherein the camera device 10 is used in a video surveillance application to visually monitor an area or asset, such as an ATM vestibule, the condition sensed by the sensor system 208 may provide information about the area or asset, which may provide enhanced monitoring. For example, the radar signals or depth camera images may be used to confirm or provide further information regarding an event that is captured by the camera device 10. This information may be also be used to confirm or improve certainty of a determination made by the video analytics module 24.

In some example embodiments, the video analytics module 24 may determine properties or characteristics of the captured image or video and/or of objects found in the scene represented by the image or video based on a combination of analysis of the image data and one or more relevant signals from sensor system 208. Relevant signals sensed by the sensor system 208 may be conditions sensed during a time period corresponding to the time period of the image data being analyzed.

According to various example applications, the sensor system 208 is located in proximity of the camera device 10, such as within the same physical area. For example, the sensor system 208 may be located such that signals received by the sensor system 208 are relevant to the image data captured by the camera device 10. Accordingly, the signals received may serve to enhance the monitoring performed using the camera device 10. It will be appreciated that the proximity of the camera device 10 with the sensor system 208 allows for effective wireless transmission of power from camera device 10 to the sensor system 208 and for effective wireless data communication between the camera device 10 and the sensor system 208. This allows the sensor system 208 to operate fully wirelessly (i.e. without requiring a wired connection for data communication with an external device and for receiving power). It will be further appreciated that even in other examples where the sensor system 208 generates signals that is not pertinent to the image data captured by the camera device 10, the interaction between the camera device 10 and the sensing device 10 allows the sensor system 208 to operate fully wirelessly.

Figure 4A:
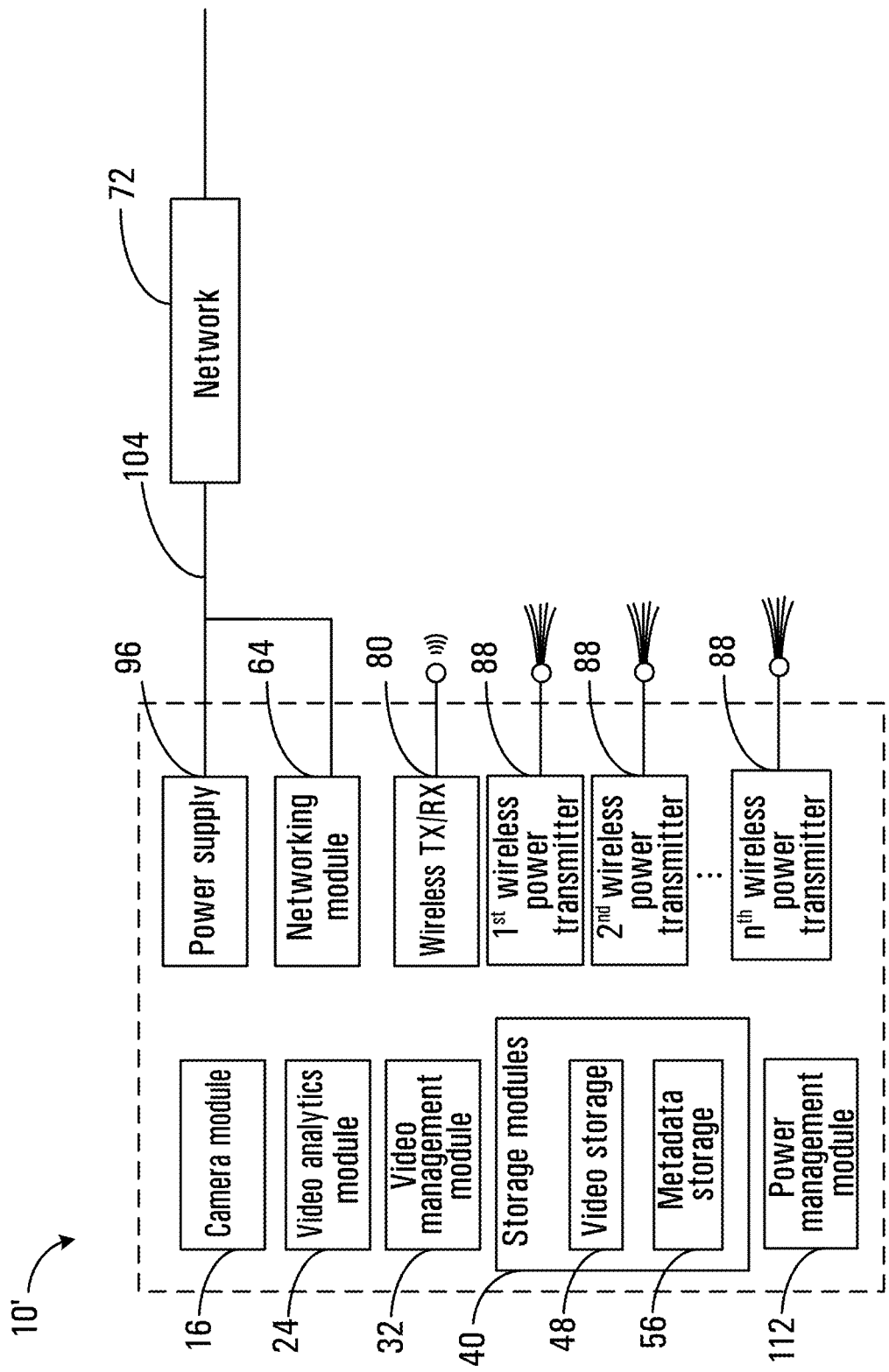
FIG. 4A illustrates a block diagram of a camera device in accordance with embodiments of the disclosure.

Referring now to FIG. 4A, therein illustrated is a block diagram of a camera device 10' according to an alternative example embodiment. The alternative camera device 10' includes the same operational module as the camera device 10 illustrated in FIG. 1 and the description provided herein regarding these modules are also applicable to the alternative camera device 10'. The alternative camera device 10' is different in that it includes a plurality of wireless power transmitters 88. In the illustrated example, the alternative camera device 10' includes n wireless power transmitters 88. Power supplied to each of the plurality of power transmitters 88 may be controlled by the power management module 112.

The plurality of power transmitters may each be used to power different sets of one or more sensor systems 208 and/or access control devices 308. For example, the sensor systems 208 may be sparsely located such that a single power transmitter 88 cannot effectively provide power to all of the sensor systems 208. The wireless transceiver 80 of the alternative camera device 10' may be used for simultaneous data communication with a plurality of sensor systems 208 to which the alternative camera device 10' is transmitting power. For example, an appropriate multiplexing scheme may be used to maintain data communication with each of the plurality of sensor systems 208.

In one example embodiment, at least one of the wireless power transmitters 88 of the alternative camera device 10' is pivotable so as to change an orientation of the wireless power transmitters 88. For example, a wireless power transmitter 88 may be angularly pivoted to be sufficiently aligned with an external sensor system 208 so as to effectively transmit power to that external device.

Figure 4B:
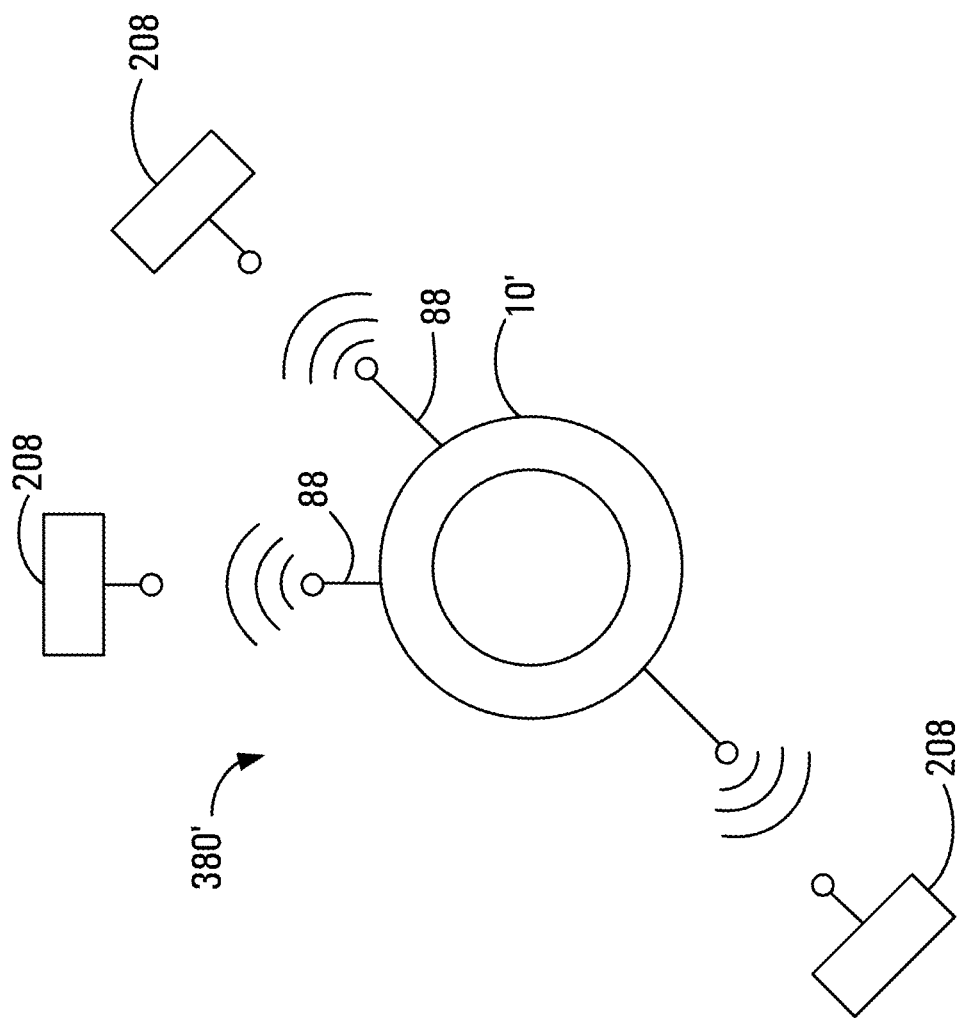
FIG. 4B illustrates a block diagram of a schematic diagram of an example deployment of the alternative camera device in accordance with embodiments of the disclosure.

Referring now to FIG. 4B, there illustrated is a schematic diagram of an example deployment 380' of an alternative camera device 10' according to one example embodiment. An example alternative camera device 10' having a circular form factor is provided. The example alternative camera device 10' is a multi-transmitter camera and includes three wireless power transmitters 88. Three sensor systems 208 are located around the camera device 10'. Each of the wireless power transmitters 88 are aligned with the location of a sensor system 208 so as to provide wireless power to that sensor system 208.

Figure 5:
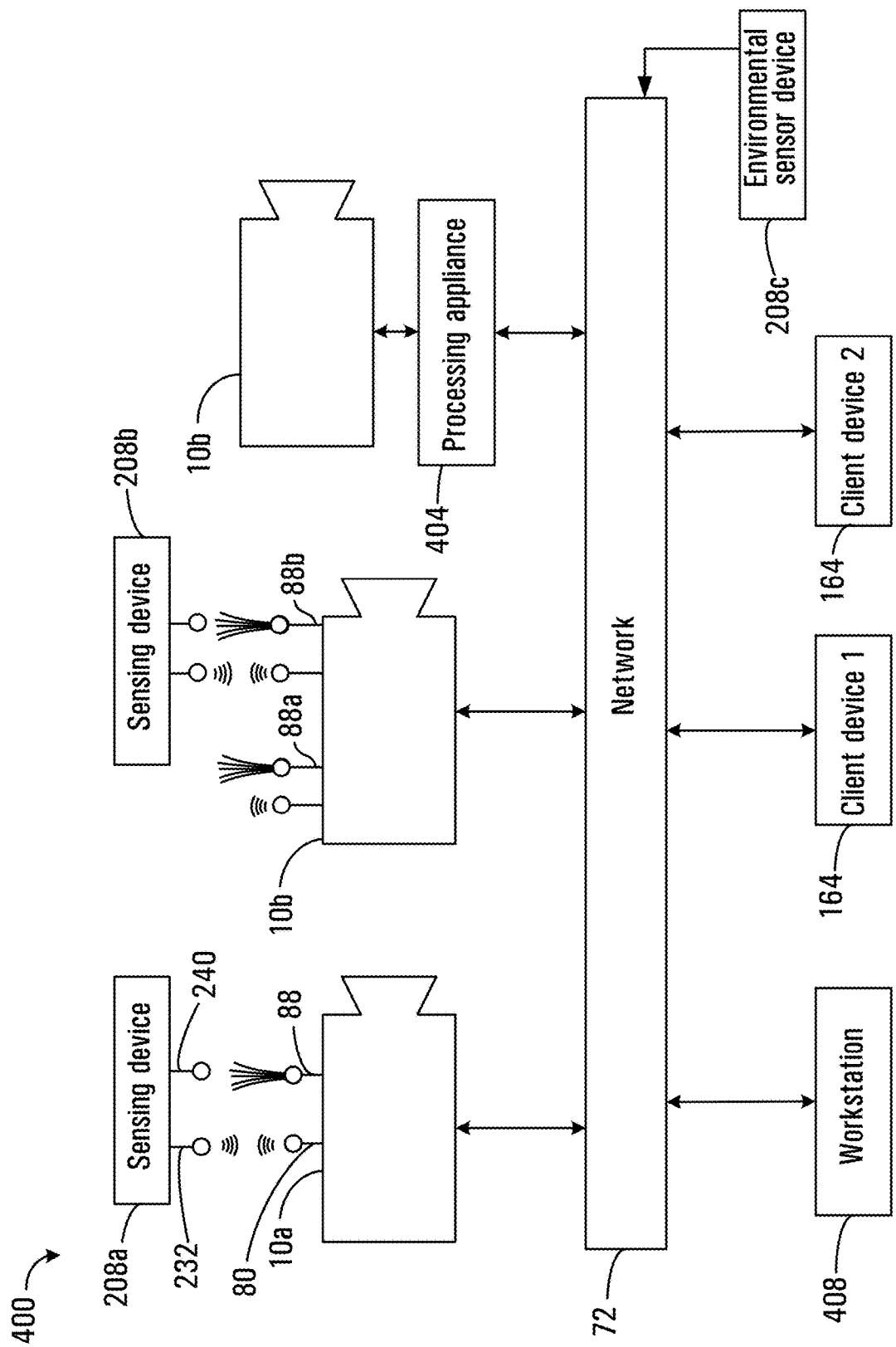
FIG. 5 illustrates a block diagram of connected devices of a video surveillance system in accordance with embodiments of the disclosure.

Referring now to FIG. 5, therein illustrated is a block diagram of connected devices of a video surveillance system 400 according to one example embodiment.

The system 400, as depicted, includes at least one camera device. In the example illustrated in FIG. 5, a first camera device 10a, a second camera device 10b, and a third camera device 10c are each connected to the network 72. Image data and/or metadata generated by the camera devices 10a, 10b, and 10c are transmitted to other network-connected devices over the network 72.

In the illustrated example, the third camera device 10c is connected to the network 72 through a processing appliance 404. The processing appliance 404 is operable to process the image data output by the third camera device 10c. The processing appliance 404 includes one or more processors and one or more memory devices coupled to the processor. The processing appliance 404 may also include one or more network interfaces.

The first camera device 10a is in data communication with a first sensor system 208a using their respective wireless transceivers 80, 232. Signals and data generated by the sensor system 208a is transmitted over the network 72 via the first camera device 10a. The first camera device 10a further transmits power wirelessly from its wireless power transmitter 88. The transmitted power is received at the sensing device 240 of the first sensor system 208a, which may be used to charge its one or more batteries or energy storage devices.

The second camera device 10b is in data communication with a second sensor system 208b. It will be understood that although two antennas are illustrated, a single wireless transceiver 80 in the second camera device 10b may be in data communication with the second sensor system 208b. Sensed signals and data generated by the second sensor system 208b is transmitted over the network 72 via the second camera device 10b.

In another example embodiment, the second camera device 10b is multi-transmitter device, as described herein with reference to FIG. 4A, and includes a first wireless power transmitter 88a and a second wireless power transmitter 88b.

The third camera device 10c is not transmitting wireless power. The third camera device 10c may be a standard IP camera that does not have wireless power transmission capabilities.

The system 400 may further include a third sensing device 208c, which may be an environmental sensing device, which is in direct connection with the network 72.

The system 400 includes at least one workstation 408 (e.g. server), each having one or more processors. The at least one workstation 408 may also include storage memory. The workstation 408 receives image data from at least one camera device 10 and performs processing of the image data. The workstation 408 may further send commands for managing and/or controlling one or more of the camera devices 10. The workstation 408 may receive raw image data from the camera device 10. Alternatively, or additionally, the workstation 408 may receive image data that has already undergone some intermediate processing, such as processing at the camera device 10 and/or at a processing appliance 404. The workstation 408 may also receive metadata from the image data and perform further processing of the image data.

The video capture and playback system 400 further includes at least one client device 164 connected to the network 72. The client device 164 is used by one or more users to interact with the system 400. Accordingly, the client device 164 includes at least one display device and at least one user input device (for example, mouse, keyboard, touch-screen, joy stick, microphone, gesture recognition device, etc.). The client device 164 is operable to display on its display device a user interface for displaying information, receiving user input, and playing back images and/or video.

For example, the client device may be any one of a personal computer, laptops, tablet, personal data assistant (PDA), cell phone, smart phone, gaming device, and other mobile and/or wearable devices.

Referring back to FIG. 2, the wireless power transmitter 88 transmits wireless power over an effective powered space. The effective powered space refers to the space in which a wireless power receiver 240 may be located and effectively receive the wirelessly transmitted power. A wireless power receiver 240 may be considered to be effectively receiving wireless power if the power at the receiver 240 exceeds a predetermined power threshold. Alternatively, a wireless power receiver 240 may be considered to be effectively receiving wireless power if the power at the receiver 240 induces a current in the receiver 240 that exceeds a predetermined current threshold.

According to various example embodiments, the field of view of the camera device 10 substantially overlaps with the effectively powered space of the wireless power transmitter 88. The field of view of the camera device 10 may be fully encompassed within the effectively powered space of wireless power transmitter 88. The field of view of the camera device 10 may be fully encompassed in that the effectively powered space occupies a larger space than the field of view. However, it will be understood that the field of view of the camera device 10 may extend past the outer limit of the effectively powered space based on a distance from the camera device 10.

By ensuring that the field of view of the camera device 10 is fully encompassed within the effectively powered space of the wireless power transmitter 88, any object that falls within the field of view will also be within effectively powered space of the wireless power transmitter 88 and can receive wireless power therefrom (so long as the distance of the object does not exceed the outer limit of the operational space). This may facilitate installation of a sensor system 208 in that the installer only needs to place the sensor system 208 within the field of view of the camera device 10 to ensure that the sensor system 208 will be properly receiving wireless power from the camera device.

According to various example embodiments wherein the optical unit of the camera device 10 is pivotable to change the field of view of the camera device 10, the wireless power transmitter 88 is configured to maintain the overlap of the field of view with the operational space. The wireless power transmitter 88 may be configured to maintain the field of view being fully encompassed with the effectively powered space over the range of pivotable motion of the optical unit of the camera. Examples of cameras with a pivotable optical unit include a dome camera and a pan-tilt-zoom (PTZ) camera.

In one example embodiment, the wireless power transmitter 88 transmits power directionally. Accordingly, the operational space of the wireless power transmitter is defined by an effective power coverage cone. The wireless power transmitter 88 and the optical unit of the camera module 16 may be substantially aligned so that the field of view of the camera device 10 overlaps with the power coverage cone. The alignment may be such that the field of view of the camera device is fully encompassed within the power coverage cone.

Figure 6:
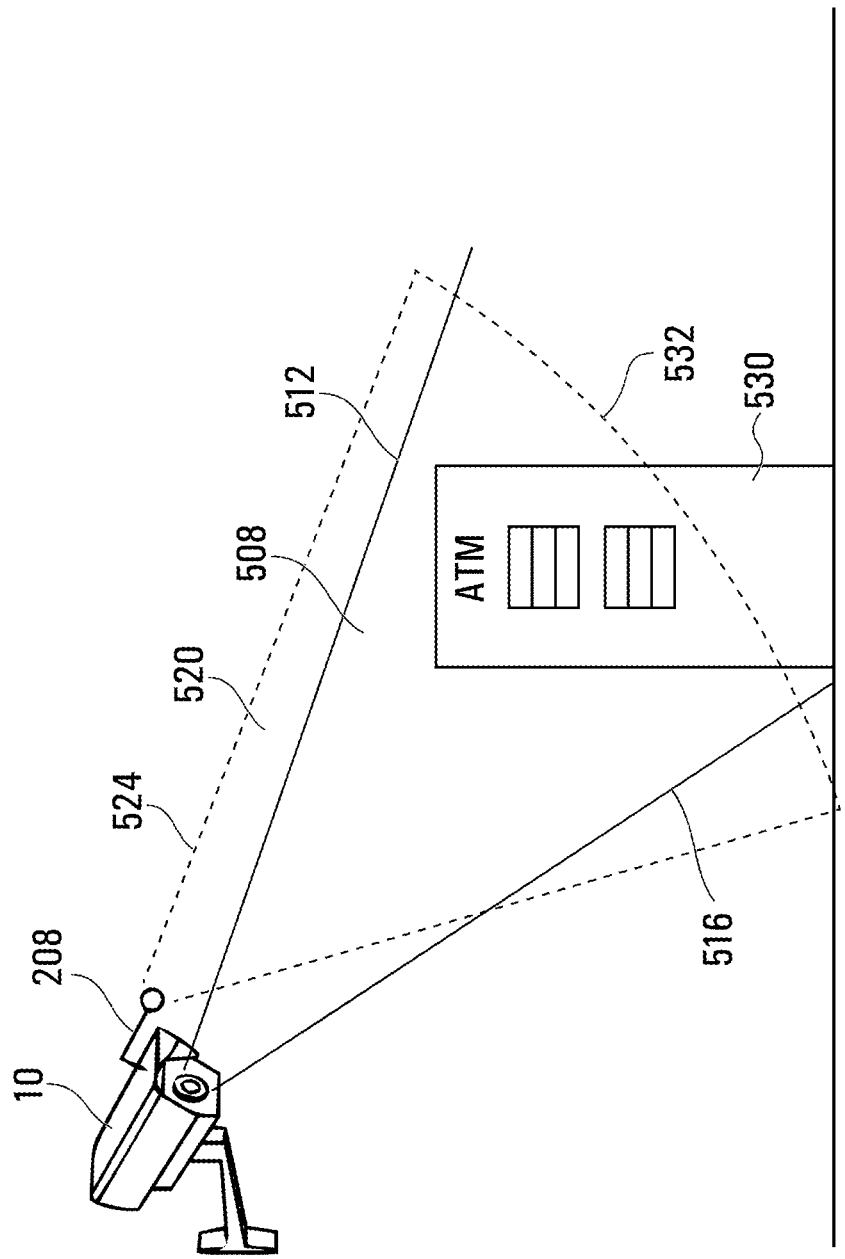
FIG. 6 illustrates a schematic diagram of an example deployment of a camera device, a sensor system, and an ATM, in accordance with embodiments of the disclosure.

Referring now to FIG. 6, therein illustrated is a schematic diagram of an example deployment of a camera device 10 and sensor system 208 and an Automatic Teller Machine (ATM) 530. The camera device 10 has a field of view 508, which may be substantially conical. In the illustrated example, the field of view 508 is defined by its upper boundary 512 and lower boundary 516. The sensor system 208 has a field of view 520 defined by its upper boundary 524, lower boundary 528 and outer limit 532. It will be appreciated that the field of view 508 is fully encompassed within field of view 520 (but for a space close to the optical unit of the camera device 10 and a space outside of the outer limit 532). The camera device 10 and sensor system 208 is oriented so as to capture ATM 530 or an area around ATM 530, such as an ATM vestibule, which is the protected asset.

Radar Sensor

Figure 3A:
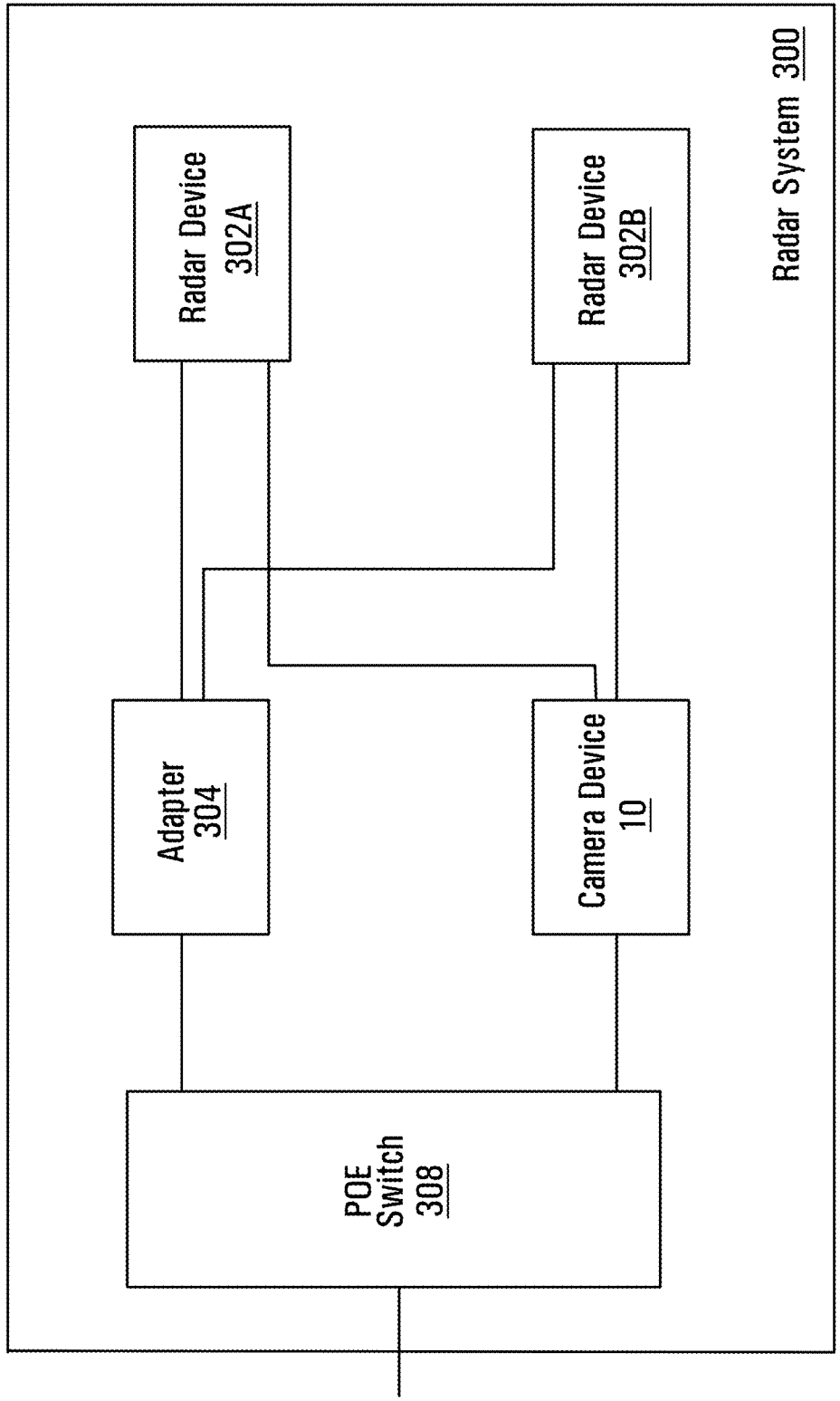
FIG. 3A illustrates a block diagram of a combined system having an example camera device and a radar system, in accordance with embodiments of the disclosure.

Referring now to FIG. 3A, sensor system 208 as described above, may include a radar system 300. Radar system 300 may be powered wirelessly, as described above, or via alternative means, including a direct power connection to a power source, such as using Power over Ethernet (POE). The radar system 300 may include two radar devices 302A and 302B, each communicatively coupled to camera device 10, for example using a cable connected to relay contacts; and power adaptor 304, for example using a power cable, including for example a 5 VDC and a ground cable. Power adaptor 304 converts signals received from POE switch 308, for example from an Ethernet cable, into power for radar devices 302A, 302B, and camera device 10. Data signals are sent from radar devices 302A, 302B to camera device 10 for further processing at camera device 10, or sent by camera device 10 through POE switch 308, using for example an Ethernet cable, for further processing. It is appreciated that while the embodiment shown in FIG. 3A does not employ a wireless power system, it may be adapted to use such a wireless power system as described above. In alternative embodiments, radar system 300 may include an access control panel or alarm intrusion panel in place of, or in addition to, camera device 10. Alternatively, radar device 302A may be a standalone device providing alerts directly to network 72.

Figure 3B:
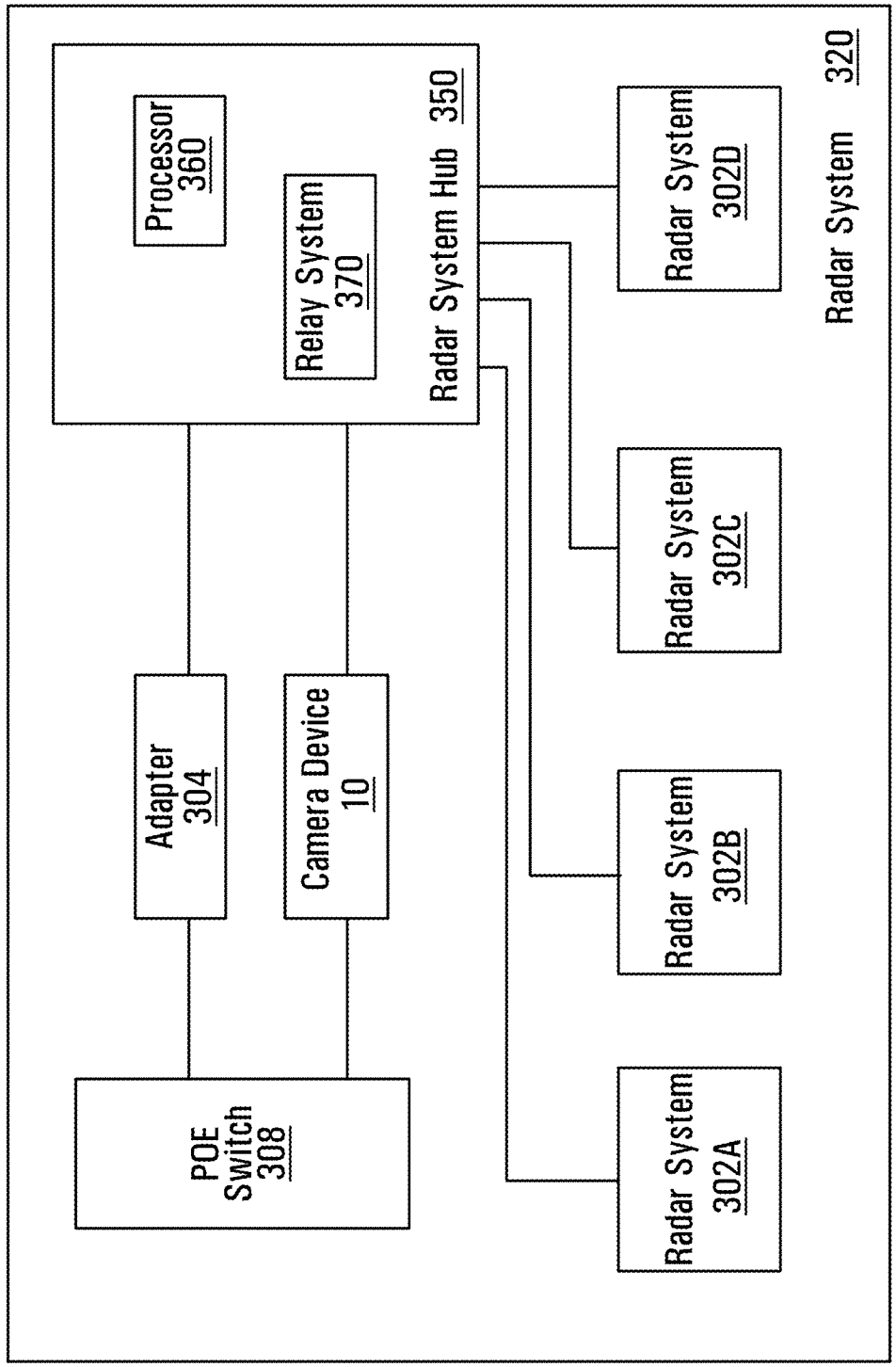
FIG. 3B illustrates a block diagram of a combined system having an example camera device and a radar system, in accordance with embodiments of the disclosure.

Referring now to FIG. 3B, video surveillance and radar system 320 include radar systems 302A, 302B, 302C, and 302D, each communicatively coupled, for example via a USB connection, to a radar system hub 350 to provide data to and receive instructions from radar system hub 350, and receive power through radar system hub 350. Radar system hub 350 is communicatively coupled to both POE adaptor 304, for example through a 5 VDC and ground line, to receive power through POE adaptor 304; and to camera device 10, to which radar system hub 350 sends data signals for further processing. POE adaptor 304 and camera device 10 are each communicatively coupled, for example via Ethernet cables, to POE switch 308.

Radar system hub 350 may be mounted above the ceiling of the location being monitored, and includes a processor 360 to configure and collect data received from radar systems 302A, 302B, 302C, and 302D. If a presence is detected by one of radar systems 302A, 302B, 302C, and 302D a relay system 370 in radar system hub 350 is energized and relays a message to camera device 10 and/or the network 72.

Figure 7:
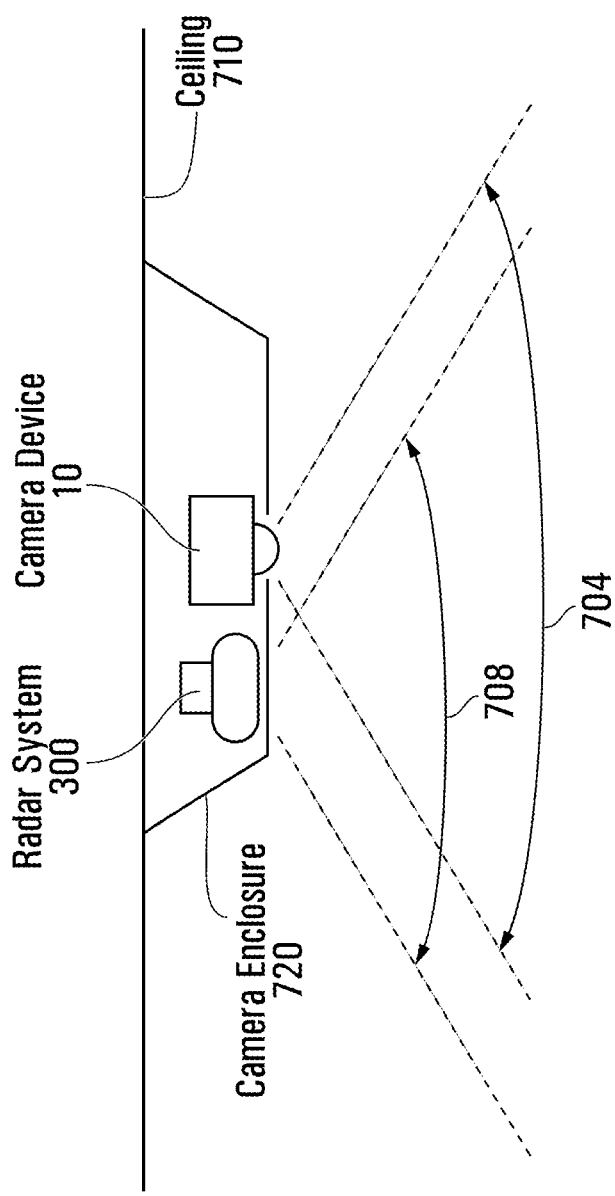
FIG. 7 illustrates a schematic diagram of an example deployment of a camera device and radar device in accordance with embodiments of the disclosure.

Referring now to FIG. 7, therein illustrated is a schematic diagram of an example ceiling deployment of a camera device 10 and radar system 300. Camera device 10, which is shown as a fisheye camera, but may be a dome camera or PTZ camera, with field of view 704, may be mounted in enclosure 720. Enclosure 720 is secured to ceiling 710 of, for example, an ATM vestibule. Radar system 300, with field of view 708, may be positioned in enclosure 720 adjacent to camera device 10, so that field of views 704 and 708 overlap.

In this embodiment camera device 10 can provide additional data related to alerts relayed by radar system 300.

Figure 8:
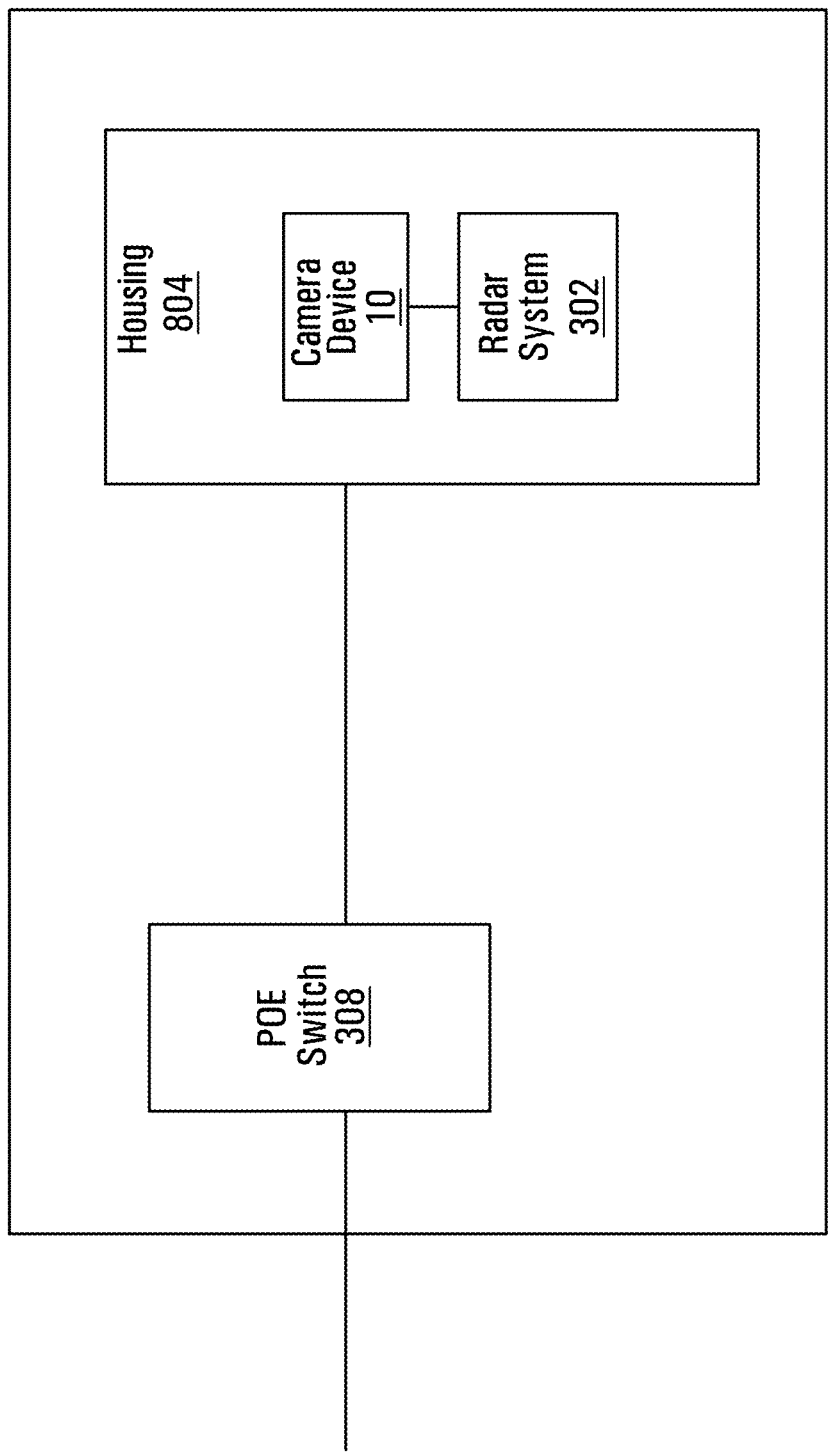
FIG. 8 illustrates a block diagram of a radar device with a camera device in accordance with embodiments of the disclosure.

Referring now to FIG. 8, therein illustrated is a block diagram of an example embodiment of a camera device 10 and radar system 300 within a housing 804. Radar system 300 may be communicatively coupled, via a cable, such as a USB cable, to camera device 10 within housing 804. Camera device 10 may receive power from and output data to POE switch 308 through a cable, such as an Ethernet cable.

Figure 9:
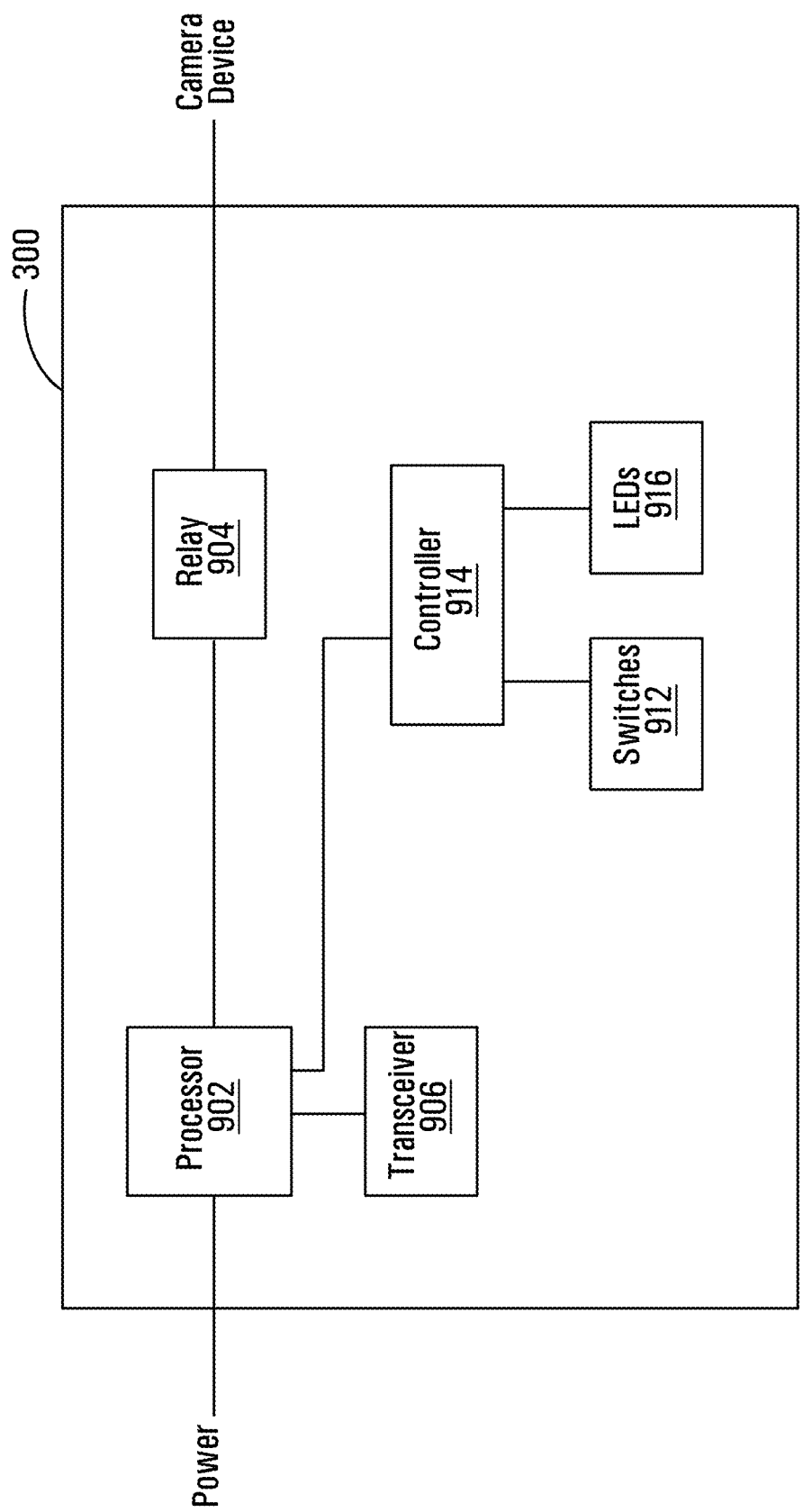
FIG. 9 illustrates a block diagram of a radar device in accordance with embodiments of the disclosure.

Referring now to FIG. 9, therein illustrated is a block diagram of an example embodiment of a radar system 300. Radar system 300 incudes processor 902, which may be an ARM-based CPU or similar CPU, and which receives power, which may be received wirelessly, via POE, or other means. Processor 902 receives input from radar transceiver 906, which may be an Ultra-Wideband (UWB) transceiver and outputs to camera device 10 through relay 904. Controller 914, communicatively coupled to processor 902 and which may be a Breakout board, controls indicators, such as LEDs 910 and may be operated by switches 912.

Figure 10:
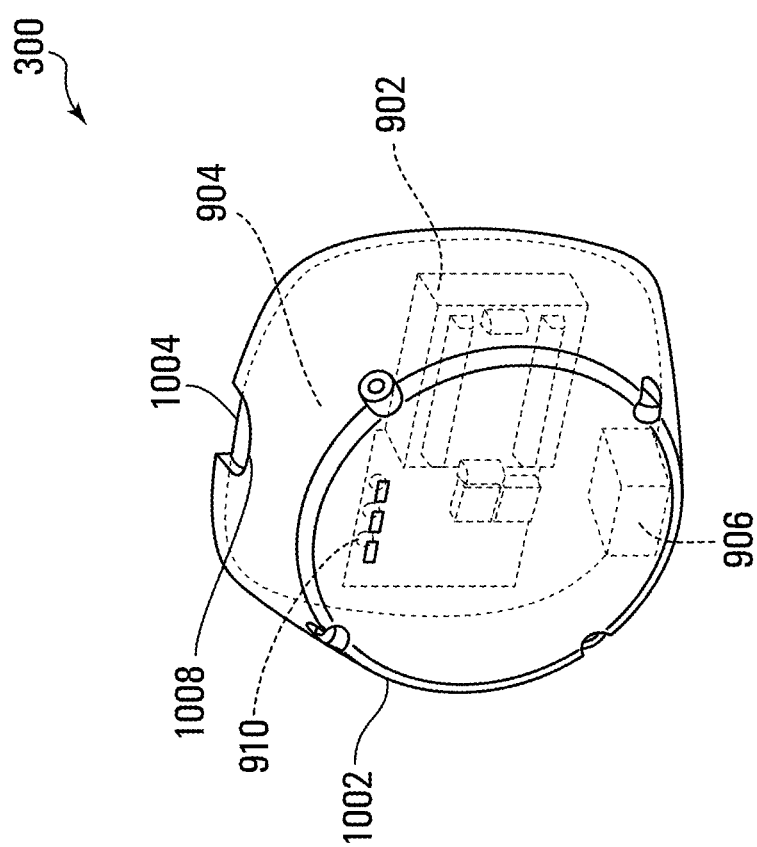
FIG. 10 illustrates a radar device in accordance with embodiments of the disclosure.

Referring now to FIG. 10, therein illustrated is an embodiment of an example of a radar system 300. Radar system 300 includes enclosure 1002, to protect the internal elements of radar system 300. Enclosure 1002 is made of material transparent to radar signals. Opposite enclosure is back plate 1004, typically a flat plate to meet with a surface for mounting radar system 300. Aperture 1008 allows a cable or other connector to enter enclosure 1002. LEDs 910 positioned on enclosure 1002 can be configured to provide status information regarding radar device 208.

Figure 11A:
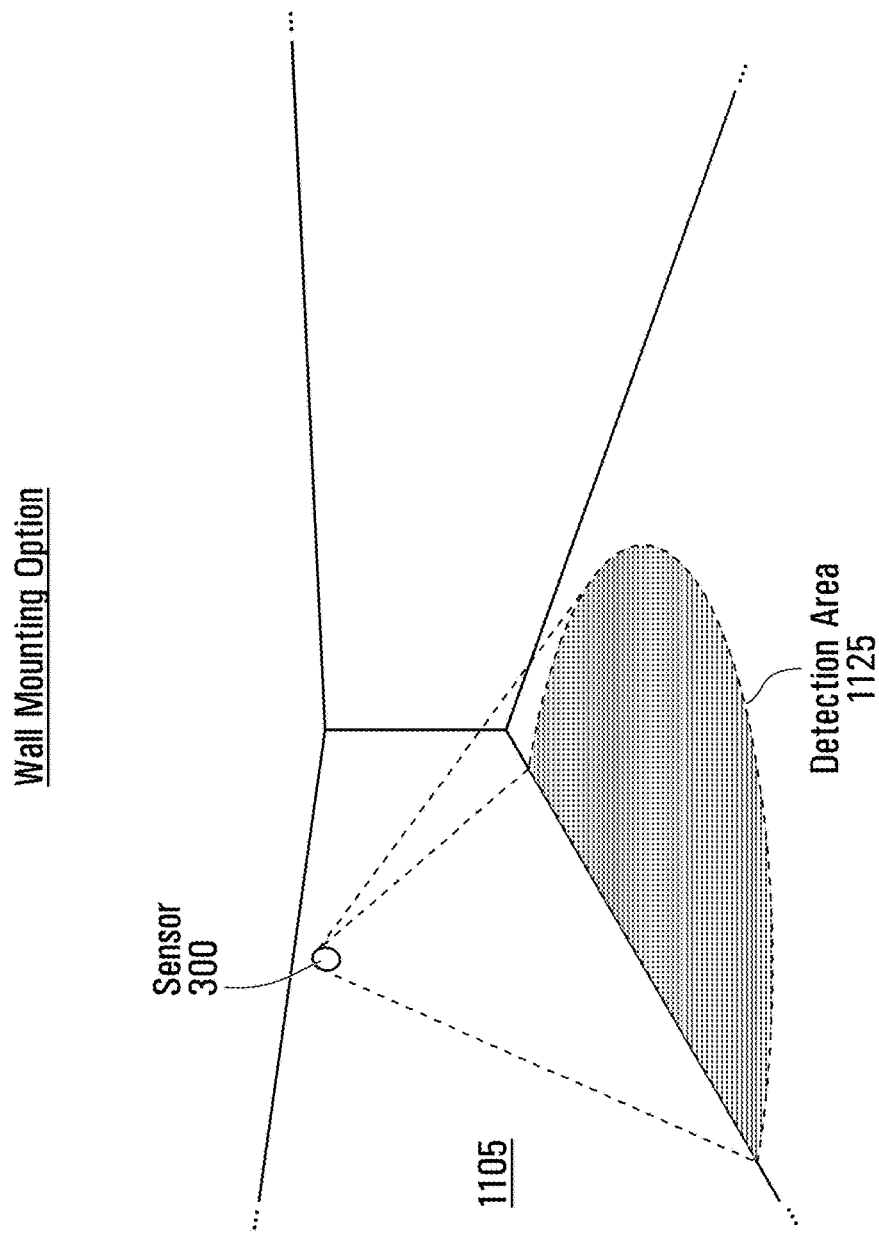
FIG. 11A illustrates a schematic diagram of an example deployment of a radar device in accordance with embodiments of the disclosure.
Figure 11B:
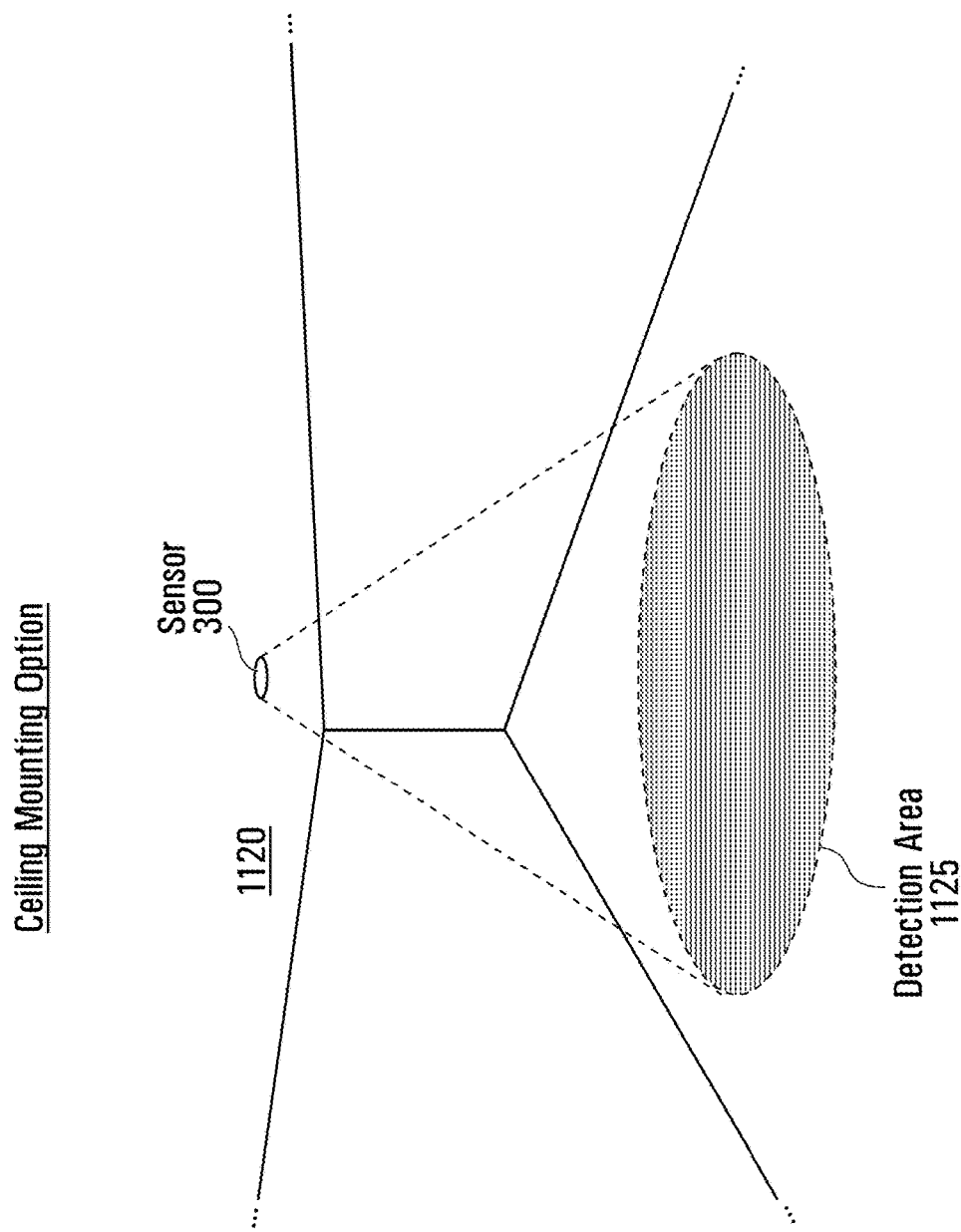
FIG. 11B illustrates a schematic diagram of an example deployment of a radar device in accordance with embodiments of the disclosure.

Referring now to FIGS. 11A and 11B, therein illustrated are detection areas provided by various example placements of radar system 300. As shown in FIG. 11A, radar system 300, when mounted to wall 1105 may be positioned to provide a detection area defined by a semicircle 1110 bisected by the meeting between wall 1105 and floor 1115. As shown in FIG. 11B, when radar system 300 is mounted to the ceiling 1120, a circular detection area 1125 can be provided.

Radar system 300 works by transceiver 906 sending and receiving radar signals. The returning signal will indicate the distance to a detected objected and the Doppler Effect is used to determine a portion of the velocity of the detected object as indicated by the change in frequency of the returned radar signal as determined using a Fourier transformation. Comparing signals over time allows processor 902 to determine the direction of the detected object's motion.

Radar system 300 may be used for a number of purposes, including identifying the presence of a person in a location, such as a dressing room, a prison cell, or ATM vestibule, by detecting biometric indicators such as breathing or heartbeats. Detection of a human being as a living object, and not as a motionless object, can be performed by short-range radars using microwave signals ranging in frequency, waveform, duration, and bandwidth. Radar system 300 can detect people not actively moving, only breathing and with a heartbeat, and thereby determine the presence of a sleeping person.

On reflection from a person, a radar signal acquires specific biometrical modulation, which does not occur in reflections from inanimate objects. This modulation is produced by heartbeats, pulsations of vessels, lungs, and skin vibrations in the region of the person's thorax and larynx, which occur synchronously with breathing motions and heartbeat. These processes are nearly periodic, with typical frequencies in the range of $0.8^{-2.5}$ Hz for heartbeat and $0.2^{-0.5}$ Hz for breathing. Therefore, the delay or phase of the reflected signal is periodically modulated by these periodic oscillations. The modulation parameters are thus determined by the frequencies and intensities of respiration and heartbeat.

The sensitivity of radar probing in the gigahertz band may reach $10^{-9}$ m. In practice, radar probing of live persons is performed against the background of reflections from local objects; as a rule, the intensity of these reflections exceeds the intensity of signals from a human object. Human objects, however, are distinguished by periodic and aperiodic modulation synchronous with the respiration and heartbeat of a person. Modulation of this type is either absent in signals reflected from local objects or has different time and spectral characteristics. This allows for recognition of signals reflected by a human person against the background reflections from local objects.

Radar systems 300 may use probing signals of different types, for example unmodulated monochromatic signals, UWB video pulses, and wideband SFM signals. The main advantage of wideband and UWB signals over monochromatic signals is that they allow the range separation of targets from exterior interference, such as reflections from local objects.

Radar Use Case

Figure 21:
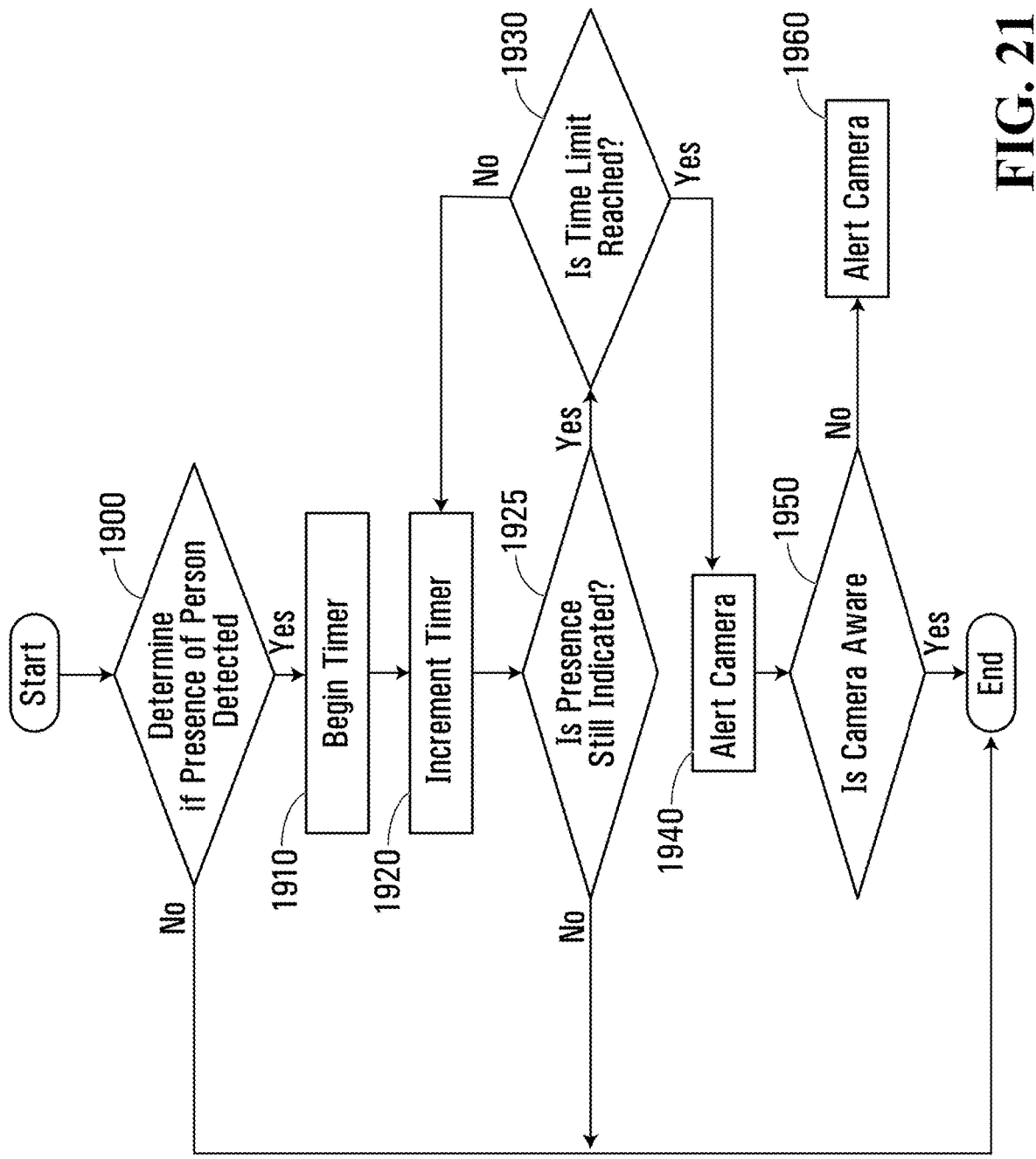
FIG. 21 illustrates a flowchart of a process by which a radar system determines loitering, in accordance with embodiments of the disclosure.

Referring now to FIG. 21, radar system 300 may be used with camera device 10 to detect the presence of individuals in an area such as an ATM vestibule. ATM vestibules are often open to the public and can be accessed by anyone. Radar system 300 sends pulses out and detects the presence of a person by determining if the returned radar signals represent biometric signals (step 1900). If not, radar system 300 resumes scanning, and if the presence of a person is detected a timer begins (step 1910) and is incremented (step 1920). If the person is still detected (step 1925) and a predetermined period of time has passed, for example ten minutes (step 1930), relay 904 alerts camera device 10 (step 1940), or alternatively network 72. If camera device 10 has already determined the presence of a person (step 1950), for example by using analytics module 24, then no further action need be taken. However, if camera device 10 is not yet alerted to the presence of a person, then the alert is escalated (step 1960), and may, for example result in: an alert to a security guard to review images from camera device 10, or for the security guard to attend to the ATM vestibule.

The biometric signals received can also be used to detect if the person is asleep or not, or is undergoing a health emergency (for example has an erratic heartbeat, which if detected could be used to alert emergency personnel), and can be used to detect persons not otherwise moving.

Depth Sensor

A depth map (or depth image) is an image that includes information relating to the distance of the surfaces of scene objects from a viewpoint such as from a depth sensor such as a 3D camera. For each pixel, or group of pixels, in the image of the depth map; there is associated a distance from the depth sensor. Depth maps can use a number of different means to show distance such as by luminance in proportion to the distance to the depth sensor, and by color. An example of luminance in proportion to the distance may be further distances darker and nearer distances lighter in a gray scale image, alternatively, it may be further distances lighter and nearer distances darker. An example of color depth map may use the red green blue (RGB) spectrum: red for further distances, yellow/green for middle distances, and blue for closer distances.

Depth sensors may use a number of different technologies to create depth maps. The technologies include Time-of-Flight (ToF), Stereo, and Structured Light.

Figure 12:
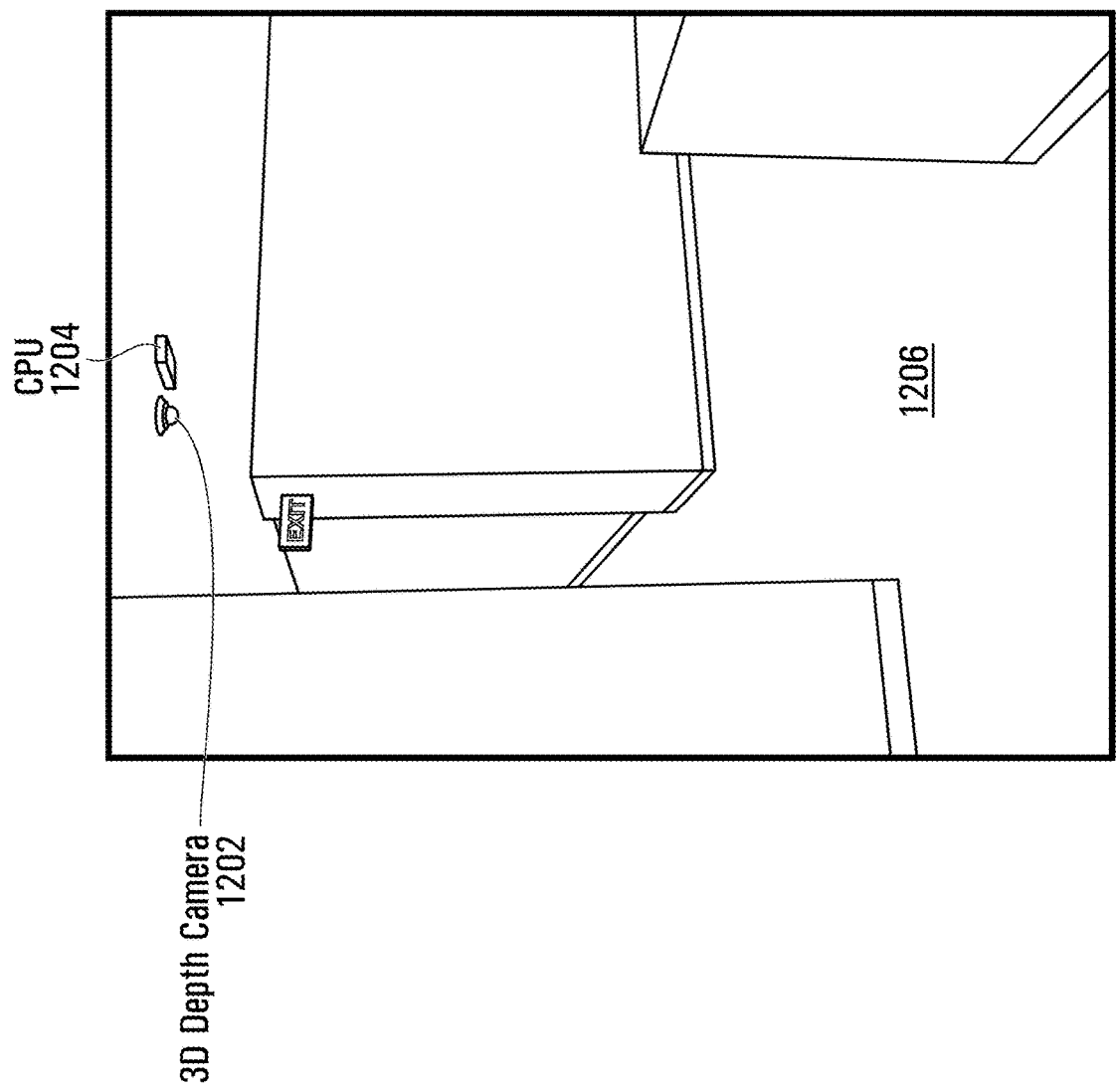
FIG. 12 illustrates an installation of two 3D cameras on the ceiling of a room, in accordance with embodiments of the disclosure.

Referring to FIG. 12, there is shown an embodiment of an example installation of two 3D cameras 1202 on the ceiling of a room 1206. The 3D cameras being structured light 3D Cameras which provide both 2D images and depth maps (or depth images). A computer 1204 to process the images of the two 3D cameras 1202 is also shown. The room 1206 could be a vestibule to ATMs (automatic teller machines) or be a building entrance. The room 1206 could include any area or zone under surveillance whether inside a building or outside of a building.

As shown in FIG. 12, the two 3D cameras 1202 are in an overhead mode which has the best chance of getting an approximate 'size' of the object. However, the overhead mode cameras cannot see what is not in the direct line of sight, for example: a square box is continuous from the top surface of the box all the way to the floor, however, a pyramid can also have an approximate volume (assuming the base is flat against the floor). If, however, you balance the pyramid on the point with the flat part facing the camera, then it will appear as a box to the 3D cameras. For a ball resting on the floor, only the top hemisphere is visible by the camera so the volume calculated would not be for a sphere but instead for a box for the bottom half of the diameter and a hemisphere for the top half. This is a limitation of line of sight range (distance) finding depth sensors such as the two 3D cameras 1202.

For a number of applications, getting an approximate 'size' (or rough 'volume') of an object is sufficient. It may also be sufficient to just count the number of pixels above a certain height threshold which is closer to calculating the surface area of the object. Of course, once you have the surface area and the depth or height, the volume is easily calculated. For certain applications, only counting surfaces above a certain threshold is used to filter out "thin" objects that may be on the floor like a paper cup or piece of paper. Any "thick" objects above, for example, 4 inches is of interest.

The 3D cameras 1202 are angled slightly for a larger field of view; the 'thickness' difference calculation is still sufficient although the side of the furthest part of the object would now get occluded by the part of the object closer to the 3D cameras 1202. In the case of the pyramid with the base flat on the floor it would now appear to be elongated away from the 3D cameras 1202. If the angle is too steep, then the error may not be tolerable (say 90 degrees facing one of the side of the pyramid; the pyramid would appear to have the shape of a triangular prism). Thus, the 3D cameras 1202 using a relatively narrow field of view (or small viewing angles from the axis of the camera view) and not too steeply angled may achieve more reliable results.

Figure 13:
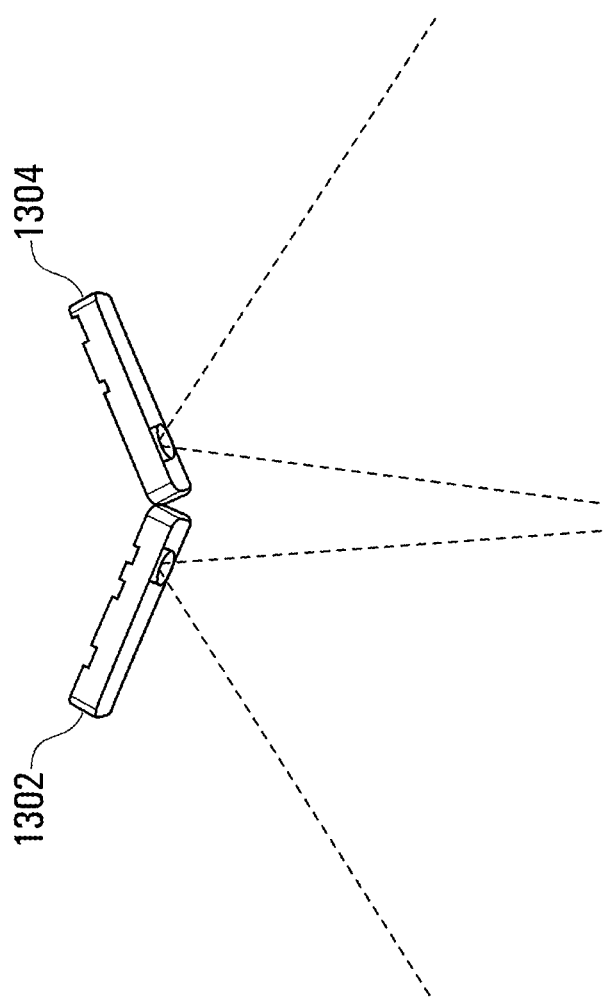
FIG. 13 illustrates a mounting for two 3D cameras for a larger field of view, in accordance with embodiments of the disclosure.
Figure 14:
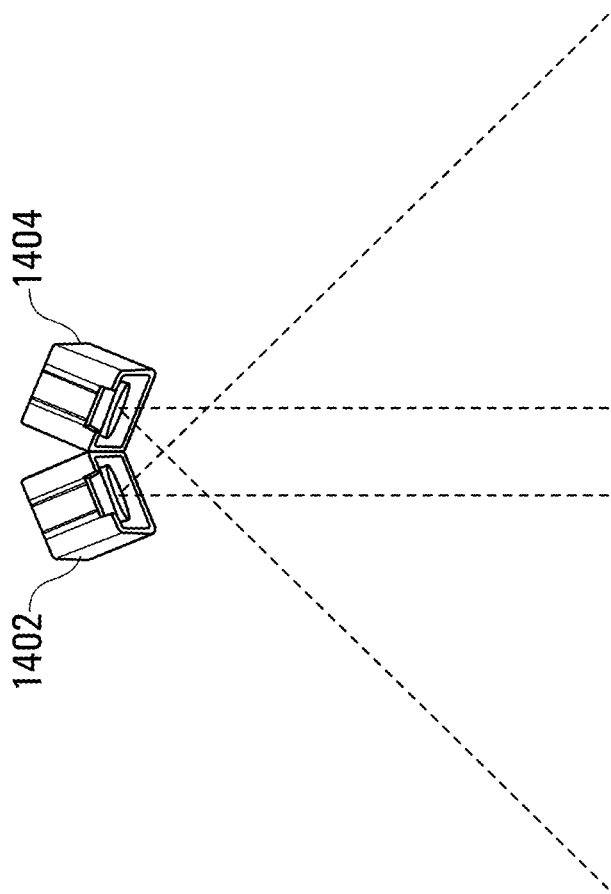
FIG. 14 illustrates an alternative mounting for two 3D cameras for a larger field of view, in accordance with embodiments of the disclosure.

Referring to FIG. 13, there is shown an example mounting for two 3D cameras 1302, 1304 for a larger field of view. Referring to FIG. 14, there is shown an alternative example mounting for two 3D cameras 1402, 1404 for a smaller field of view. While the embodiment of FIG. 12 uses two 3D cameras 1202, another embodiment may use only one 3D camera and the disclosure as shown in FIGS. 15 to 19 as described below would still apply accordingly. A further embodiment may use more than two 3D cameras and the disclosure as shown in FIGS. 15 to 19 would still apply accordingly.

Figure 15:
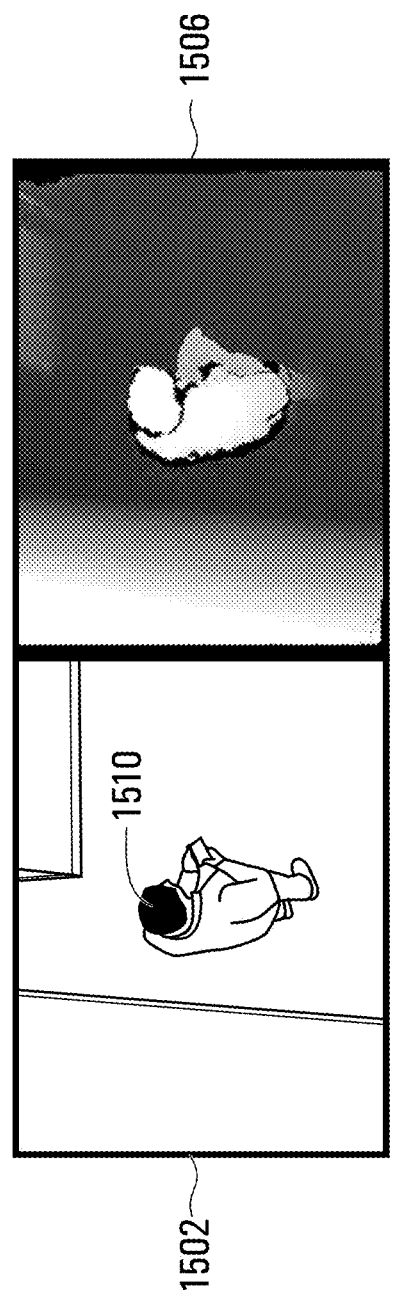
FIG. 15 illustrates example images from the installation of FIG. 12.

Referring to FIG. 15, there is shown example images from the installation of FIG. 12. Shown is a 2D image 1502 and its corresponding depth map 1506. As an example, a person is shown standing in the 2D image 1502 and in the corresponding depth map 1506. The depth map 1506 is displayed using a color map (RGB spectrum) to better visualize the depth information (and shown in grayscale in FIG. 15). Depth map 1506 without the person and a depth map without the person are together the background or the model of the background; the background being the installation room with its floors, walls and any other stationary objects. The model of the background, for example, is composed of average depths from 1000 frames (or camera shots) of the depth maps 1506, and the depth map without a person (when the area under surveillance has no objects in the field of view of the depth sensor) for each of the pixels or group of pixels. Alternatively, the model of the background, for example, is composed of least distances to the 3D cameras 1202, 1204 from 1000 frames of the depth maps 1506, 1508 for each of the pixels or group of pixels.

Figure 16:
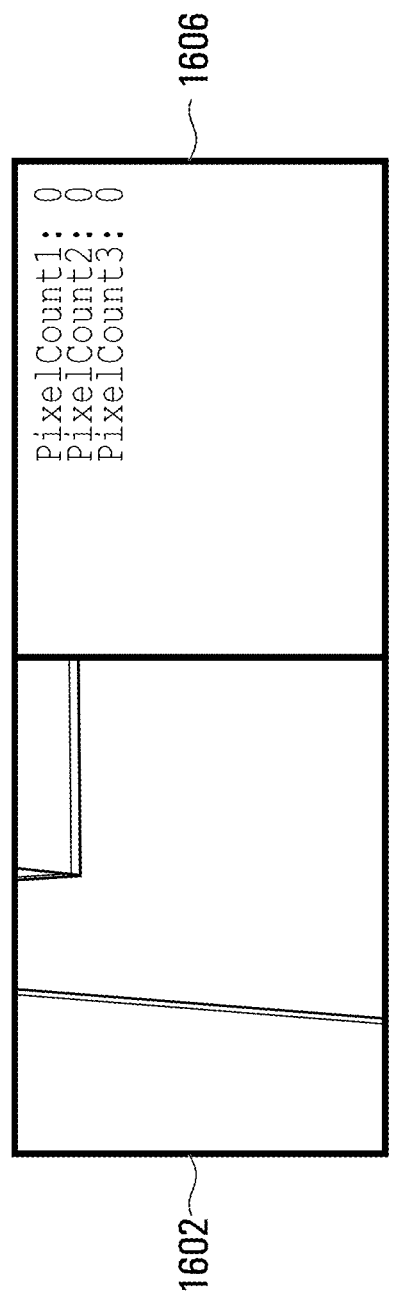
FIG. 16 illustrates additional example images from the installation of FIG. 12.

Referring to FIG. 16, there is shown additional example images from the installation of FIG. 12. There is a two 2D image 1602 and its corresponding delta depth map 1606. There are no objects or people shown in the 2D image and the corresponding delta depth map 1606. The delta depth map 1606 is the net difference between subtracting (or comparing) the depth maps (generated corresponding to the 2D image 1602) from the model of the background. The delta depth map 1606 represents the displacement of an object or objects from the floor of the installation, and would be the foreground. Due to noise, the delta depth map 1606 may not always represent zero displacement, however, within a certain range, for example 1 inch, they are equivalent to zero and is represented as blue in the delta depth map 1606. Further, by setting a threshold of, for example, 4 inches from the floor, "thin" objects, like a paper cup or piece of paper, may be filtered out.

Figure 17:
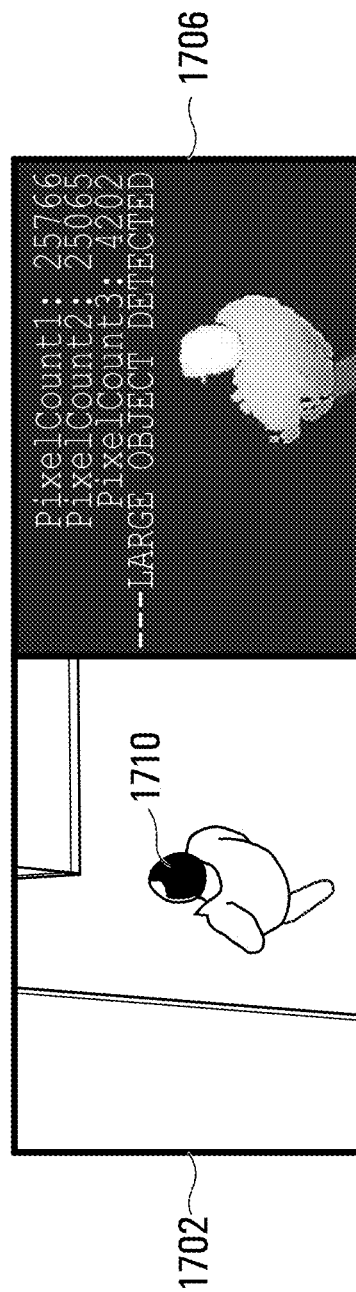
FIG. 17 illustrates additional example images from the installation of FIG. 12 with a person.

Referring to FIG. 17, there is shown additional example images from the installation of FIG. 12 with a person 1710. There is a 2D image 1702 and its corresponding delta depth map 1706. The delta depth map 1706 shows the person 1710 and is detected by the video analytics module 24 as a large object. A volume may be calculated from the amount of the displacement of a blob (the person 1710) in the delta depth map 1706. Either the volume or the amount of the displacement may then be used to indicate whether it could be a person by the video analytics module 24.

Figure 18:
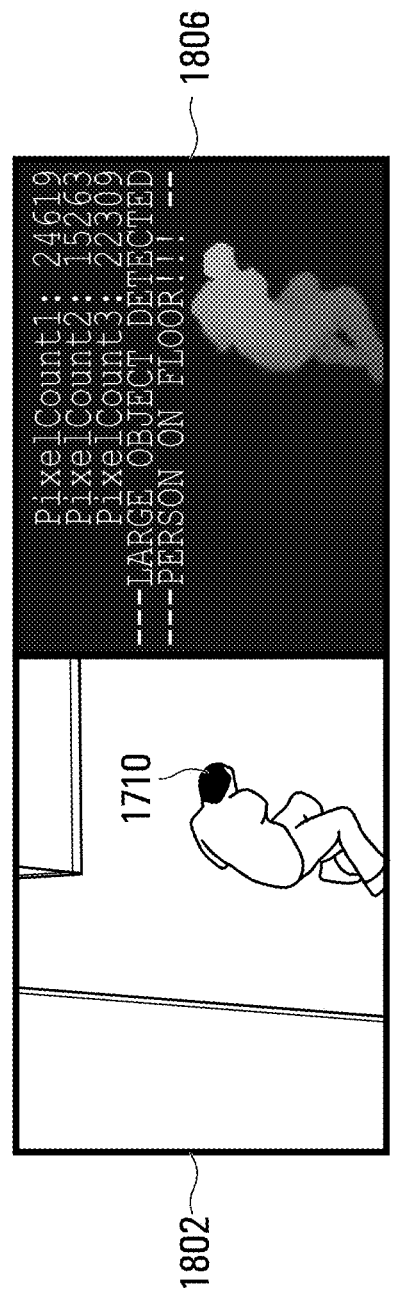
FIG. 18 illustrates additional example images from the installation of FIG. 12 with a person.

Referring to FIG. 18, there is shown additional example images from the installation of FIG. 12 with a person 1810. There is a 2D image 1802 and its corresponding delta depth map 1806. The delta depth map 1806 shows the person 1810 (the blob 1810) and is detected by the video analytics module 24 as a large object due to the amount of displacement (or volume). However, since the least depth of the person 1810 in the delta depth map 1806 is not high and since the volume is sufficient to indicate a person, the video analytics module 24 indicates that the person 1810 is on the floor. If the blob 1810 remains within the fields of view of the 3D cameras 1202 beyond a period of time, then the person 1810 is also labelled as sleeping on the floor, or loitering. The period of time may set by a user depending on the experiences of operating at any particular location of what may be loitering at that particular location.

Figure 19:
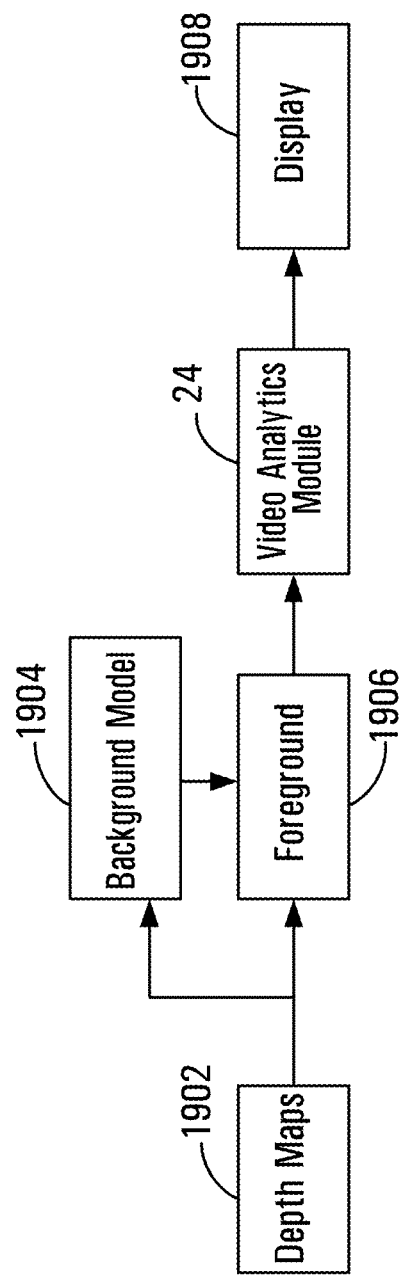
FIG. 19 illustrates a flowchart of image processing of the installation of FIG. 12, in accordance with embodiments of the disclosure.

Referring to FIG. 19, there is shown a flowchart of an example of an embodiment of image processing of the installation of FIG. 12. The two 3D cameras 1202 capture depth data to create depth maps 1902 which are processed to create a model of the background 1904. The model of the background 1904 is created by capturing a series (or frames) of depth maps 1902 and every pixel is updated with the lowest non-zero height value (depth) within a certain time period. Within the certain time period, for example, there is 1,000 frames of the depth maps 1902.

There may be certain limitation with the 3D cameras 1202. The structured light 3D Cameras uses infrared (IR) light patterns to detect depth or distance to target. However, certain types of surfaces (reflective surfaces) reflect away the IR patterns of the structured light of 3D cameras, resulting in no reading (or zero depth) in the depth map. Further, when the ambient IR is strong, the IR patterns can be washed out, resulting in no readings as well. In all cases, in order to generate a stable and valid background model, the depth value of those "no reading" areas have to be estimated. The estimation is based on the neighbor pixels and is called interpolation. There are various methods of interpolation that could be used, for example, morphological filtering and bilinear filtering.

The generation of the model of the background 1904 also includes interpolating the height values (depth) for reflective regions where the 3D cameras 1202 is unable to detect the depth. The model of the background 1904 may be recalculated periodically. Once calculated, any new frames of the depth maps 1902 are subtracted from the model of the background 1904 to produce corresponding foreground frames 1906 (delta depth maps). The value of each pixel of the model of the background 1904 is subtracted from the value of each corresponding pixel of each frame of the depth maps 1902 to produce the foreground frames 1906 or delta depth maps. Where there is only one 3D camera, each depth map frame (a 3D camera shot) is compared to the model of the background to generate a corresponding foreground frame. The video analytics module 24 then analyzes the foreground frames 1906 to detect objects, large objects, and people loitering. The person 1810 is accordingly detected to be loitering after the person 1810 is detected to be in the foreground frames 1906 for a certain period of time and to be also sleeping on the floor if the maximum height is below a certain level, for example, 3 feet above the floor. The results are then displayed 1908 as shown in FIG. 18 as person on floor 1812.

Figure 20:
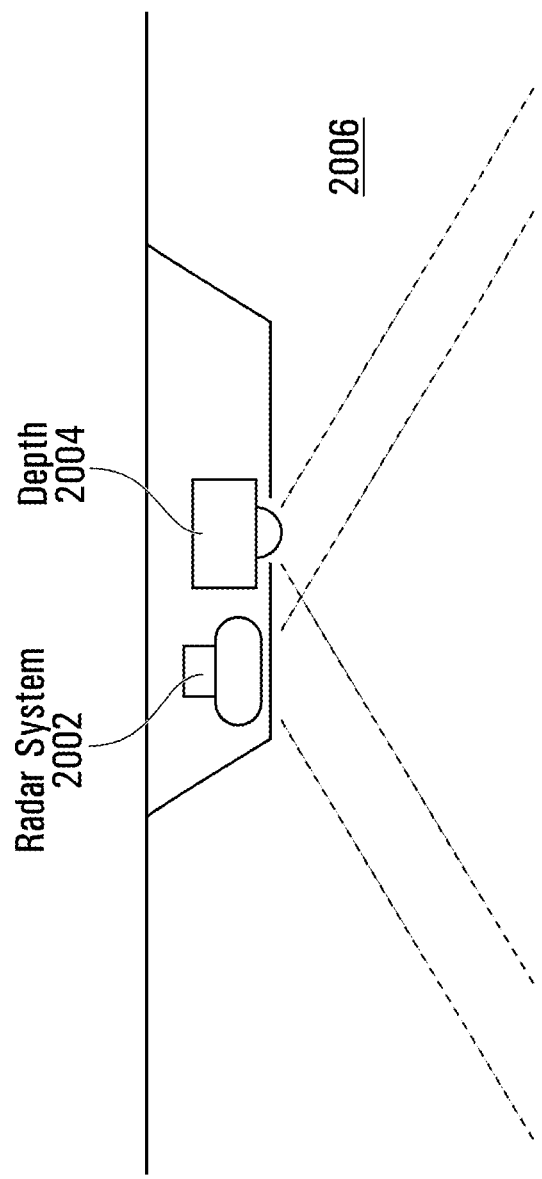
FIG. 20 illustrates another installation of a radar sensor and a depth sensor on the ceiling of a room, in accordance with embodiments of the disclosure.

Referring to FIG. 20, there is shown an example embodiment installation of a radar sensor 2002 and a depth sensor 2004 on the ceiling of a room 2006. The radar sensor 2002 may be, for example, a UWB radar sensor. The depth sensor 2004 may be, for example, a structured light 3D camera. The combination of having two different sensors enhances the reliability of detecting objects and any consequential loitering. Each sensor by itself has certain weaknesses, for example, a structured light 3D Camera may not function properly in strong sunlight due to its use of Infrared light, and the radar sensor 2004 may not be configured to easily detect more than one object or person. The video analytics module 24 may, for example, be set to use the outputs from both sensors 2002, 2004 to detect a person or a person loitering, but the video analytics module 24 will indicate such detection if only one of the sensors 2002, 2004 indicates a person, or a person is loitering. It is also more reliable when the outputs of both sensors indicate a person, or a person that is loitering.

Referring to FIG. 6, when the sensor 208 is a depth sensor like a structured light 3D Camera, the generated depth maps may be very accurate, for example, having a resolution of up to 1 mm. The depth maps of the sensor 208 are used to generate a model of the background of the ATM 530. The model of the background may be generated as shown in FIGS. 18 and 19. The model of the background is then subtracted (or compared to) from new frames of depth maps taken by the sensor 208 to generate foreground frames. Where the foreground frames show a difference from the model of the background then an alert may be generated to indicate that the ATM 530 may have been tampered by the installation of a façade to skim the banking data of users. The ATM 530 includes any machine where users may enter banking data such as pass code or PIN (personal identification number) such as gas station pumps and government service kiosks.

In an alternative embodiment sensor 208, such as radar sensor 300 may be in a portable unit that can be carried by a single user. In this embodiment, sensor 208 may be powered by a battery or the like, and may include a display to notify users of the detection of a heartbeat or other indicates of a presence.

Alternatively, instead of ATM vestibules, sensor 208, when a radar system 300 or a depth sensor, may be used to determine loitering in other locations, such as an elevator.

Other Uses of Presence Detection

Radar system 300 and depth sensors, as described above can have many other uses. For example radar system 300 and depth cameras 1202 may be used to monitor the presence of persons in a conference room or office, which can be useful for HVAC or lighting controls, by activating such systems only when persons are detected in the area. If radar system 300 is used, it can be positioned outside of a room to let a person outside by use of an indicator, such as a sign or light, know if the room is currently unoccupied and available, or if someone is in the room. Alternatively, radar system 300 directed out of a room, such as an office or meeting room, can let a person in the room know if a person is waiting outside without a disruption occurring. Similarly radar system 300 or depth cameras 1202 could be used to determine if a bathroom is occupied and alert a person outside.

Portable units with radar systems 300 could be used for search and rescue, military and police purposes. Radar systems 300 can be used to determine the location of a person needing assistance or posing a threat from outside a room or building.

Another use case occurs when determining if a person has been left behind, for example should an emergency occur in an office, or in a biohazard room, radar system 300 or a depth cameras 1202 can be used to determine if a person is still present in the affected area. In particular as radar signals pass through walls, radar system 300 can be positioned to determine if a person is within a room from a location outside the room. For example a radar system 300 can be positioned strategically to monitor a floor of an office building and be configured to quickly relay to rescue personnel whether a person is still breathing and where the person is on the floor.

The ability to detect whether a person is sleeping or not can be used in several different contexts. For example, hospital beds can be monitored to determine whether or not a patient is sleeping. Prison cells can be monitored to determine if a prisoner is awake or active when they should not be. Sleeping persons could be detected in alleys, subways or rail cars. Other uses would be elderly care rooms, bathrooms in hospitals or elderly care facilities, or even closets.

Other Uses of Radar Systems

The fact that radar signals pass through walls allows radar system 300 to have a number of uses in multi-room environments to detect the presence or absence of persons in one or more rooms, and if a person is present, determine the length of time the person has been present. Radar system 300 can also be used to detect the level of activity of a person, for example if they are sleeping or moving.

Figure 22:
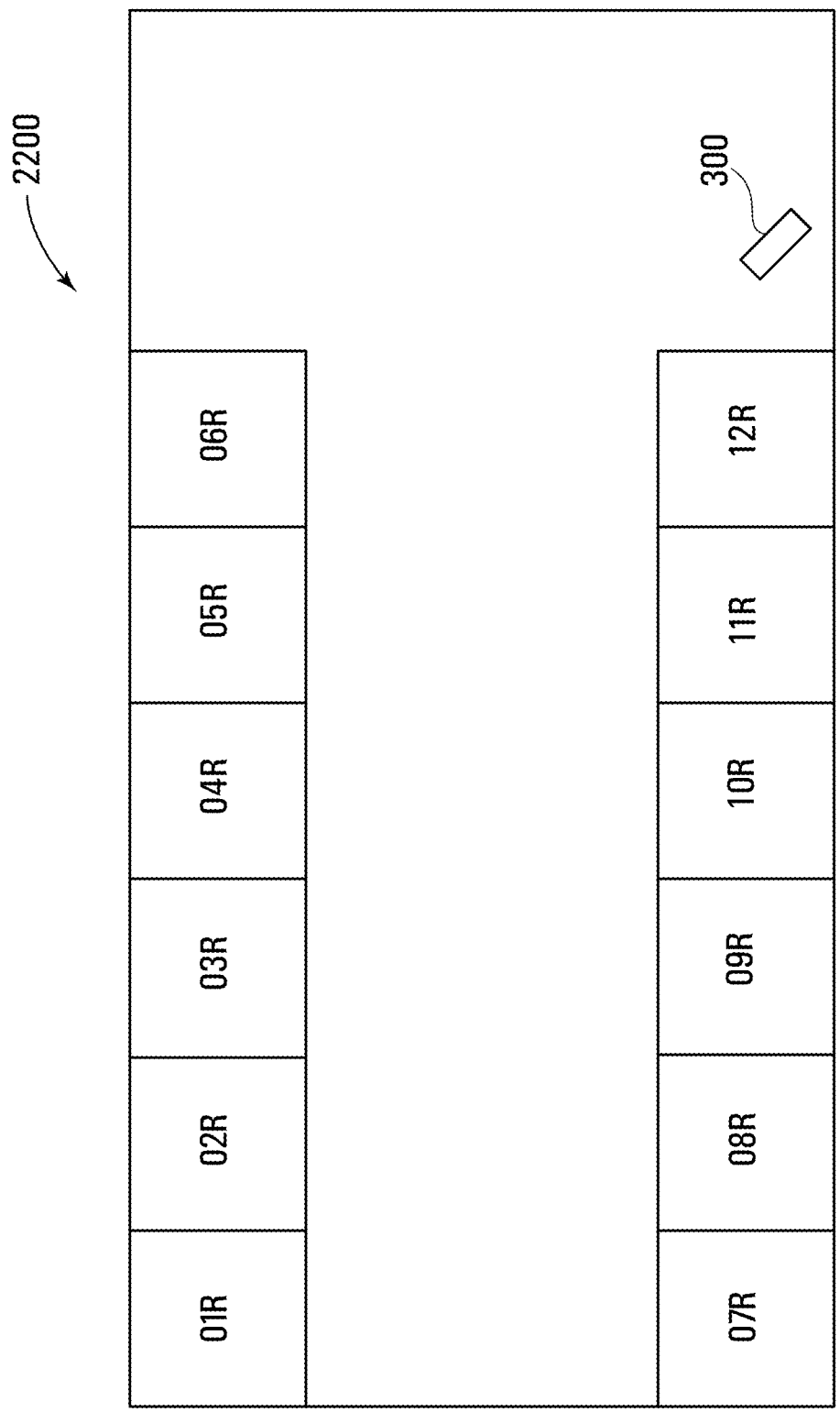
FIG. 22 illustrates a deployment of a radar system for monitoring a plurality of changing rooms, in accordance with embodiments of the disclosure.

One such multi room environment is a retail store changing room 2200, as shown in FIG. 22. One radar system 300 may be positioned to monitor several changing Rooms 01R-12R to detect occupancy. Thus employees could determine if a particular changing Room 01R-12R that was expected to be occupied is not, or conversely, that a changing Room 01R-12R that was expected not to be occupied, is actually occupied.

Figure 23:
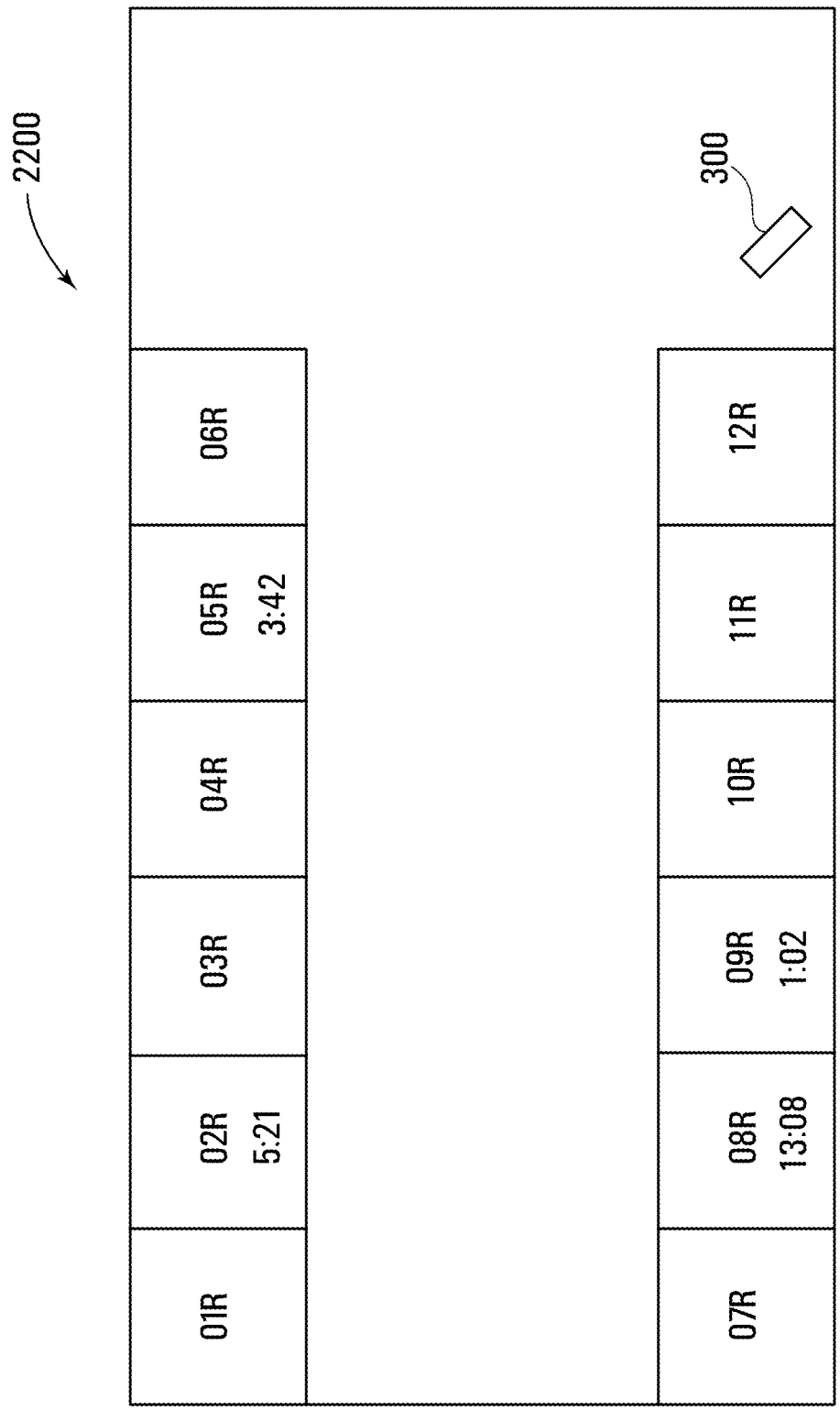
FIG. 23 illustrates a display generated by a radar system monitoring a plurality of changing rooms, in accordance with embodiments of the disclosure.

The occupancy of the Rooms 01R-12R can be displayed to employees using a graph, as shown in FIG. 23. Each Room is shown, and may be listed, or shown as in FIG. 23 from a top down view. Each Room 01R-12R may be marked, for example as black when empty or a color, such as blue when occupied. Other indicators may be used, such as a text string display indicating whether the room is occupied or unoccupied.

A time limit can be used to determine when the Room has been occupied longer than expected and may require assistance from employees. A colour, for example, red can be used to indicate to a user whether a Room has been occupied beyond a reasonable time. For example, as shown in FIG. 23, Rooms 02R, 05R, 08R, and 09R are occupied; Rooms 01R, 03R, 04R, 06R, 07R, 10R, 11R, and 12R are not. Room 02R has been occupied for 5 minutes and 21 seconds; Room 05R, 3 minutes and 42 seconds; and Room 09R, 1 minute and 2 seconds; and such Rooms may be colored to show the occupancy state. Room 08R has been occupied for 13 minutes, 8 seconds which is over the predetermined time limit, which may be for example, 6, 8, 10, 12 or more minutes, and thus may be colored red. When an occupant remains in the Room for longer than the predetermined time, then an alert may be generated for staff. A similar approach could be used to monitor the occupancy of bathrooms, without invading the privacy of the occupants.

Figure 24:
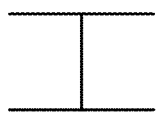
FIG. 24 illustrates a deployment of a radar system for monitoring a plurality of prison cells, in accordance with embodiments of the disclosure.
Figure 24:
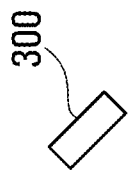

Another multi room environment in which radar system 300 and depth sensors are useful is prisons. As shown in FIGS. 24 and 25, radar system 300 can be positioned to monitor both several prison cells 01C to 018C and the hallway H in between each row of cells 01C-09C and 10C-18C.

A report can be generated, an embodiment of which is partially shown in FIG. 25 and displayed to a user, such as a guard. FIG. 25 shows a table include a column for each cell and the hallway (cells 01C-03C and 18C are shown, and hallway H), Alternatively, a map can be generated of the prison with color codes and descriptions, in a similar fashion as described above with reference to changing rooms (example embodiments of descriptions are shown in FIG. 25). In this embodiment the status of the occupant may be indicated, such as "sleeping" or "active" to let the guard known when a particular cell contains sleeping occupants. Furthermore, radar system 300 or a depth cameras 1202 can be used to determine if a person is not in their cell, by determining if a cell is unoccupied or if an unauthorized person is in an area (for example hallway H) in which they should not be present. Radar system 300 or depth cameras 1202 can also be used to determine is a person is no longer breathing, for example a person in a cell or hospital bed, and can provide an alert to obtain assistance should the person stop breathing.

A display can be presented to an authorized person, for example a prison guard, so that a quick glance to the display is enough to determine if anyone is not in a location in which they should be (e.g. missing from their prison cell, or out of a hospital room or care facility bed). Alarms or alerts can be generated should a prisoner (or patient) not be in the correct room. Besides prison cells, the system could be used with detention cells, holding cells, drunk tanks, and other areas where a person would be expected or not expected or it is desired to measure duration of a stay. The system could also be used in a farm environment, to allow farmers to ensure animals are present in their appropriate pens, and could be positioned in stables, tie-stalls or barns.

Another use of radar system 300 may be to detect the location of animals, such as mice or rats in a home. Small animals can be difficult to detect in a home and are often under floors or within walls. In this embodiment, radar system 300 may be portable to allow a user to move throughout a home to locate the animal, and use the ability of radar signals to pass through walls and floors to indicate the presence of a heartbeat of an animal.

Another use of radar system 300 or depth cameras 1202 could be used is waiting rooms, such as doctor offices, emergency rooms, and hotel or office lobbies to generate an alert if a person is detected. Restaurants, bars, and stock rooms could be monitored by radar system 300 or depth cameras 1202 to detect the presence of an unauthorized person.

Yet another use of radar system 300 is to monitor transportation facilities, such as a bus, train or taxi to ensure that no one is present.

In the embodiments described above more than one presence detectors such as depth cameras 1202 or radar system 300 may be used.

Other uses for radar system 300 or a depth cameras 1202 may include people counting, or wrong way detection (for people or vehicles).

Yet another use for sensor 208 is to determine that a heartbeat is not present. For example, a user might believe they are seeing some sort of apparition, and could use sensor 208 to determine if the object being viewed has a heartbeat.

Abnormal Usage Detection System

In some embodiments, a radar system (such as radar system 300) or a depth sensor (such as depth sensor 208) when used, for example, in an ATM vestibule to detect loitering, may additionally include a door status switch or the like that can be used to reset the timer. Each time the door opens, for example when a new customer enters, the timer may be reset so that no alarm is triggered, which is especially useful in high traffic periods. Such an embodiment, and variations thereof, are described in further detail below.

Figure 26:
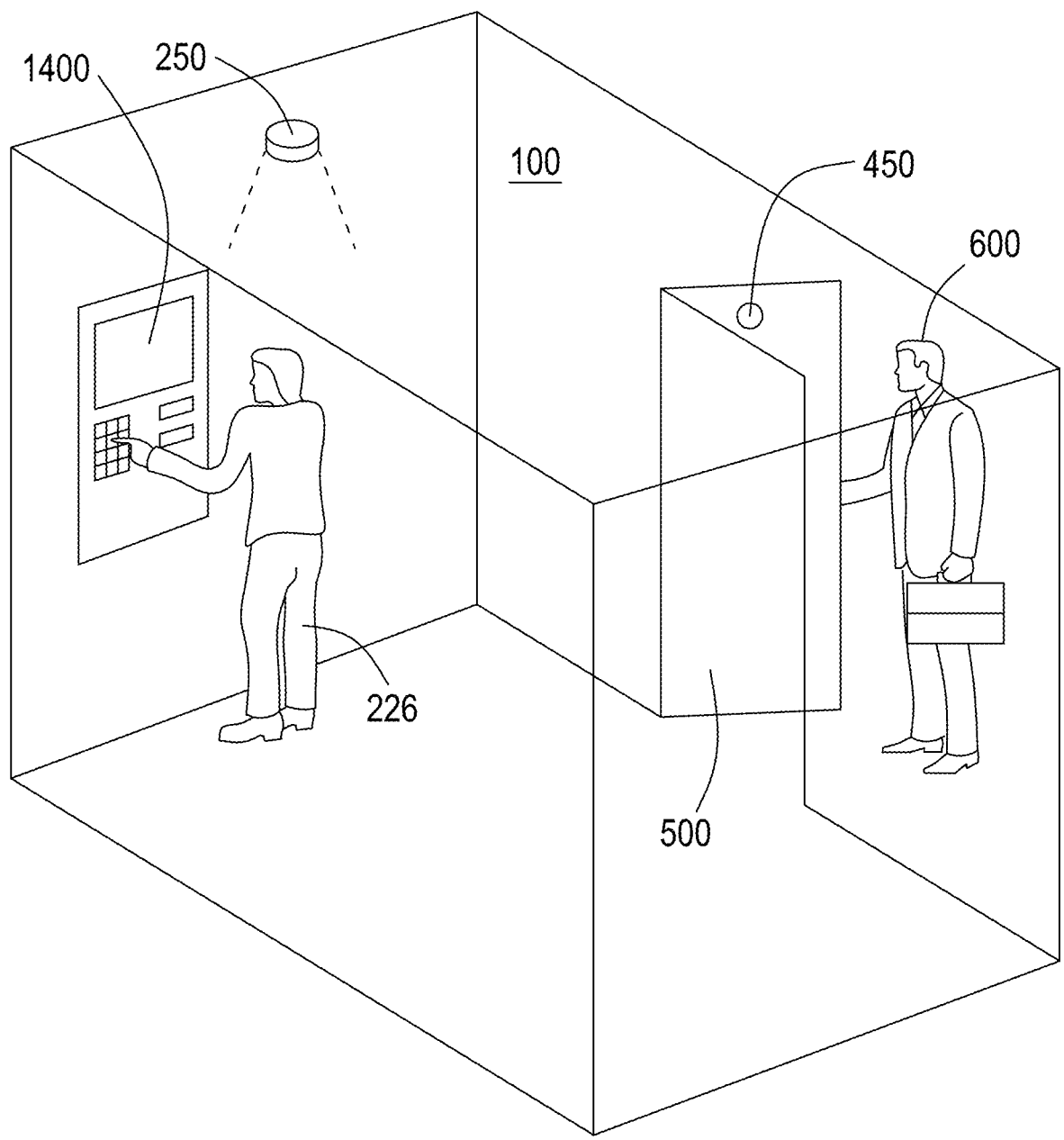
FIG. 26 illustrates a vestibule with an abnormal usage detection system, in accordance with embodiments of the disclosure.

Referring to FIG. 26, therein illustrated is a vestibule 100 incorporating an abnormal usage detection system 1000, according to an embodiment of the disclosure. In the present embodiment, vestibule 100 is an ATM vestibule comprising an ATM machine 1400, although the disclosure extends to any other suitable vestibule or similar location which a user may wish to monitor for undesirable behaviour, such as an ATM back room, a bank vault, a locker room, a bathroom, a prison room, or a changing room. The abnormal usage detection system 1000 includes one or more presence detectors 250, such as radar-based devices, and a door sensor 450. Presence detector 250 is configured to detect a presence of a person within vestibule 100 (such as person 226 interacting with ATM machine 1400), as described in further detail below. Door sensor 450 is configured to detect when a door 500 providing access to the interior of vestibule 100 is opened (for example by a second person 600 wishing to use ATM machine 1400). Although not shown in FIG. 26, abnormal usage detection system 1000 further includes a control module with one or more processors communicative with presence detector 250 and operable to activate a timer and an alarm.

Figure 27:
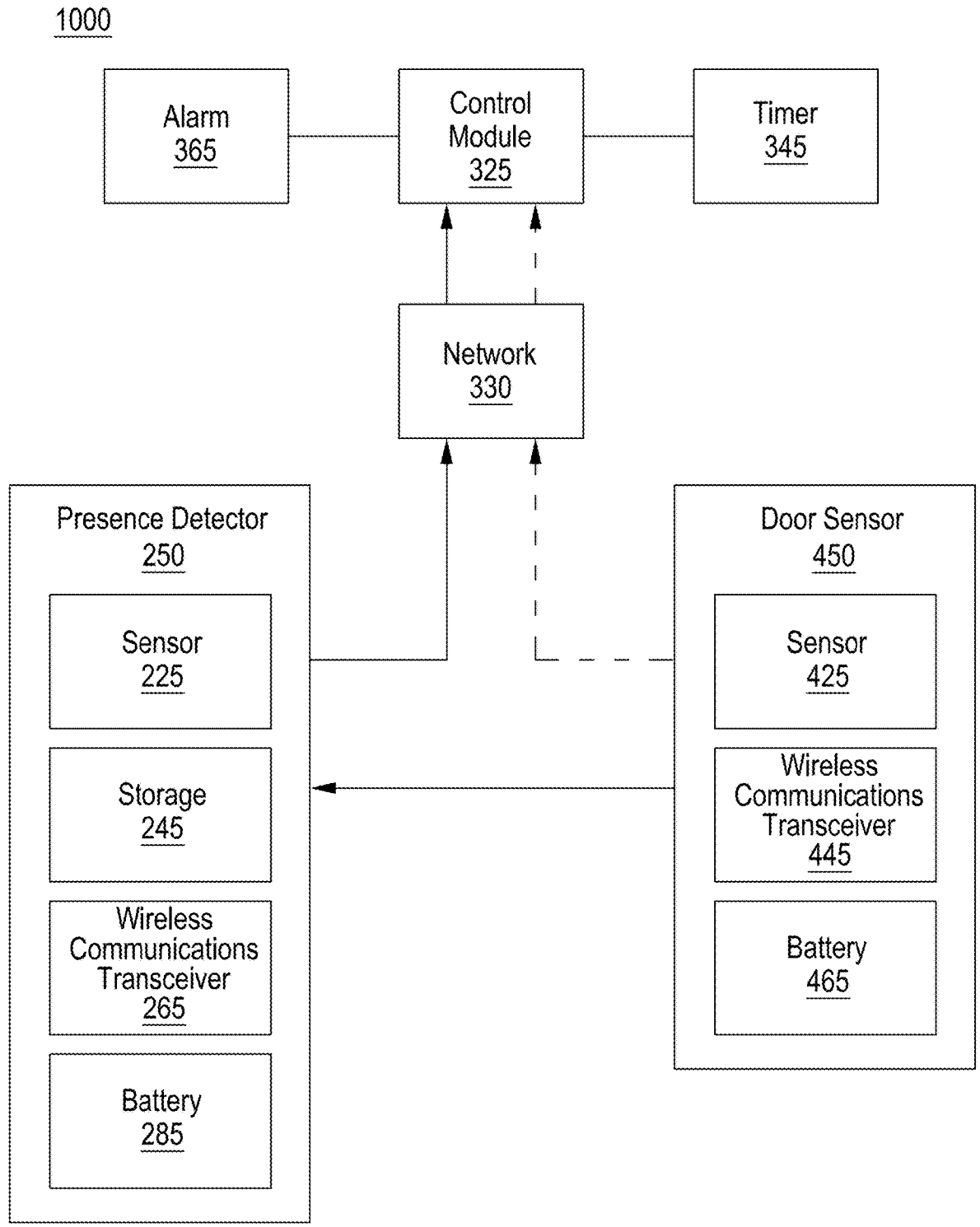
FIG. 27 is a detailed block diagram of an abnormal usage detection system in accordance with embodiments of the disclosure.

Turning to FIG. 27, therein illustrated is a detailed block diagram of abnormal usage detection system 1000, including presence detector 250 and door sensor 450. Presence detector 250 includes a storage module 245. Storage module 245 is operatively connected with a sensor 225 of presence detector 250, to receive sensed signals and store the sensed signals. In particular, sensor 225 is configured to detect reflected radar signals emitted by presence detector 250. Storage module 245 may also store one or more sensing rules. Sensor 225 may implement sensing based on applicable sensing rules. For example, the rules may cause sensor 225 to cease sensing during given periods of the day, for example during daylight, and carry out sensing at other periods of the day, for example during the night, when persons are most likely to be loitering or sleeping within ATM vestibule 100.

Presence detector 250 further includes a wireless communications transceiver 265 operable for providing data communication with a wireless communications transceiver 445 of door sensor 450. Wireless communications transceiver 265 may be a short-range, low-power transceiver, and may implement a wireless communication protocol that is compatible with the communication protocol implemented by wireless communications transceiver 445 of door sensor 450. In some embodiments, presence detector 250 may communicate with door sensor 450 using a wired communication channel.

Sensed signals generated by sensor 225 can be transmitted from presence detector 250 using wireless communications transceiver 265. The sensed data may be transmitted to an external control module 325, over a network 330. In some embodiments, presence detector 250 may communicate with control module 325 using a wired communication channel.

Presence detector 250 may be further configured to receive commands. The commands may have been initially transmitted from control module 325 via network 330. For example, the commands may be for controlling presence detector 250, and may include commands for changing sensing rules applied to presence detector 250.

Presence detector 250 further includes at least one battery 285 or other suitable form of power storage device for supplying power to one or more components of presence detector 250. Battery 285 may supply power to sensor 225 and wireless communications transceiver 265. In some embodiments, presence detector 250 may alternatively be powered using an external power source (not shown).

Door sensor 450 comprises a sensor 425, wireless communications transceiver 445, and a battery 465. Sensor 425 may be a gyroscope or accelerometer attached to door 500 of vestibule 100. Alternatively, sensor 425 may be installed on the latch of door 500. Sensor 425 may report to presence detector 250 a change in a status of door 500, using wireless communications transceiver 445. In some embodiments, door sensor 450 may communicate with presence detector 250 using a wired communication channel. In still other embodiments, door sensor 450 may communicate the status of door 500 directly to control module 325, via network 330. Although in the present embodiment sensor 425 is described as being a gyroscope or an accelerometer, the disclosure extends to any suitable sensor operable to detect when door 500 is opened or otherwise changes from one state to another state.

Control module 325 is operable to receive and process outputs from presence detector 250, as will be described in further detail below. In embodiments in which door sensor 450 communicates directly with control module 325, control module 325 is further operable to receive and process outputs from door sensor 450. Thus, control module 325 is operable to receive an indication of whether a presence of a person has been detected within vestibule 100, as well as a current status (e.g. open or closed) of door 500. Control module 325 is further communicatively coupled (either through a wired or wireless connection) to a timer 345 and an alarm 365, and is operable to cause timer 345 to initiate a count-down, and to activate alarm 365.

In some embodiments, presence detector 250 may be implemented in the form of sensor system 208 described above in connection with FIG. 2, and may receive power from camera device 10, also as described above in connection with FIG. 2. In this case, external control module 325 may be implemented in the form of external network device 264 described above in connection with FIG. 2, and network 330 may be implemented in the form of network 72 described above in connection with FIG. 2.

Figure 28:
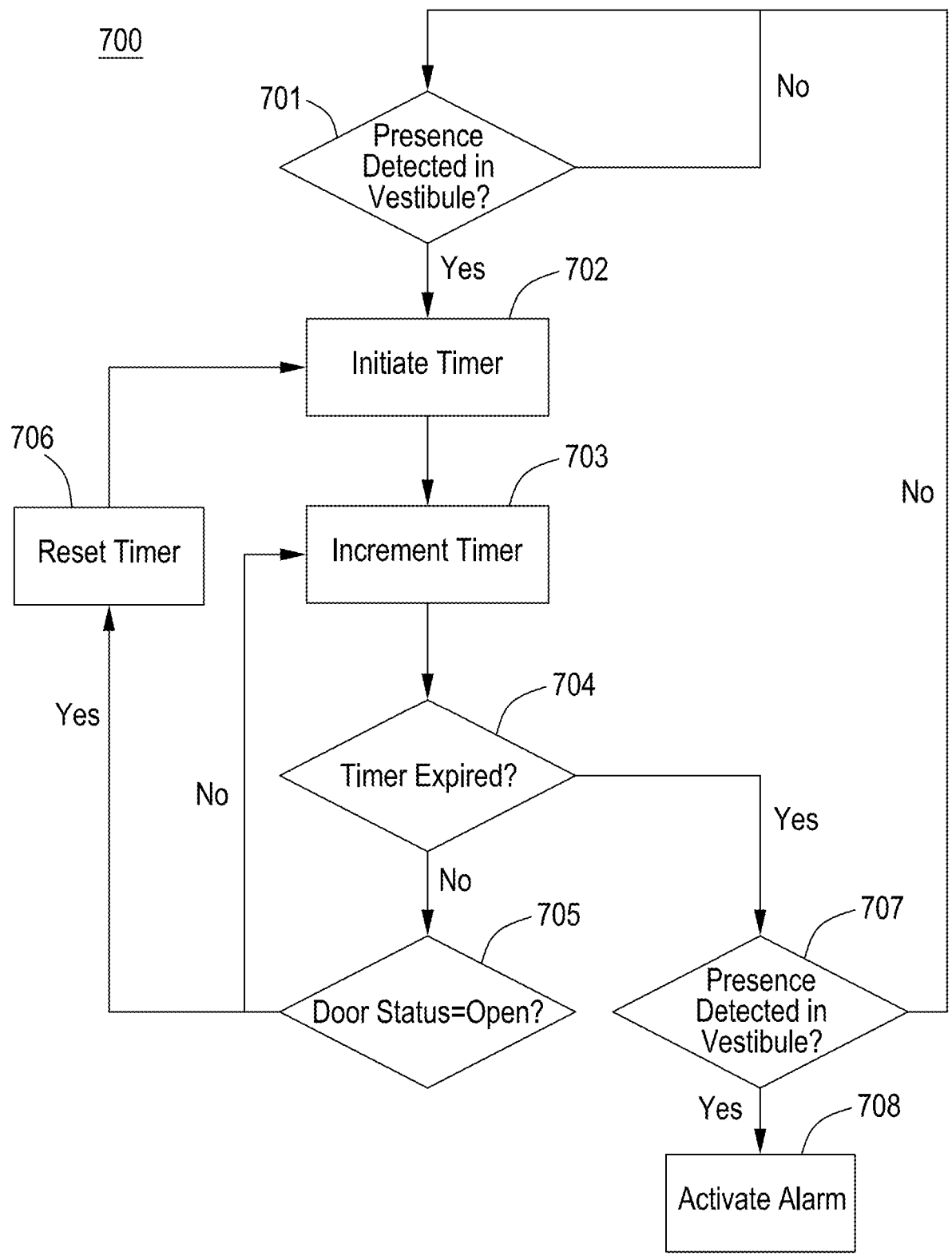
FIG. 28 is a flow diagram of a method of detecting abnormal usage at a location, in accordance with embodiments of the disclosure.

Turning to FIG. 28, therein illustrated is a method 700 of detecting abnormal usage of a vestibule, according to embodiments of the disclosure. Control module 325 determines whether a presence of a person is detected within vestibule 100 (step 701). For example, presence detector 250, using sensor 225, may emit and detect reflections of radar signals, as described above. The returned radar signals may then be processed by presence detector 250, the result of which is sent from presence detector 250 to control module 325, via network 330. Alternatively, the raw returned radar signals may be sent to control module 325 which may then process the data to determine whether a presence of a person is detected within vestibule 100.

If control module 325 determines that no presence is detected within vestibule 100, then the process may loop by repeating step 701. For example, until a presence is detected within vestibule 100, step 701 may periodically repeat, for example every 10 seconds. If control module 325 determines that a presence is detected within vestibule 100, then control module 325 initiates a count-down using timer 345 (step 702). For example, timer 345 may count down from 5 minutes, or 10 minutes, or some other preset duration of time which is indicative of typical, normal usage of vestibule 100.

Timer 345 is then incremented (step 703), i.e. the count-down proceeds one increment closer to expiration. Control module 325 then determines whether the count-down has expired (step 704). If the count-down has not expired, then control module 325 determines whether a current status of door 500 is set to open (i.e. door 500 is open) (step 705). Control module 325 may determine the current status of door 500 by reading the output from presence detector 250 which has received the status of door 500 from door sensor 450. Alternatively, as discussed above, door sensor 450 may be configured to communicate directly with control module 325, in which case control module 325 may receive the status of door 500 directly from door sensor 450. If the door status is determined to be set to open, then control module 325 resets timer 345 (step 706). In some embodiments, instead of resetting timer 345, control module 325 may pause the count-down for a predetermined duration, or may otherwise adjust the count-down. The process returns to step 702 where timer 345 is re-initiated and the count-down begins anew. If the status of door 500 is determined not to be set to open (i.e. door 500 is closed), then the process returns to step 703. In some embodiments, control module 325 may determine the door status before determining whether timer 345 has expired. In other words, step 705 may be processed before step 704.

If control module 325 determines at step 704 that timer 345 has expired (e.g. the count-down has reached zero), then control module 325 determines whether a presence of a person is detected within vestibule 100 (step 707). For example, as described above, this may be performed by either control module 325 reading the output of presence detector 250, or else processing the raw, reflected radar signals received at presence detector 250. If no presence is detected within vestibule 100, then control module 325 may determine that the usage of vestibule 100 was normal given its duration, and the process may then loop back to step 701. If on the other hand a presence is detected within vestibule 100, then control module 325 may determine that the ongoing usage of vestibule 100 is of a duration indicative of abnormal behaviour, and control module 325 activates alarm 365 (step 708).

In some embodiments, instead of activating alarm 365, control module 325 may issue a notification to an operator of abnormal usage detection system 1000 that abnormal usage or behaviour has been detected within vestibule 100. In still other embodiments, control module 325 may cause a camera within vestibule 100 (for example camera device 10) to capture an image or video of the interior of vestibule 100, so that an operator of abnormal usage detection system 1000 may ascertain further information as to the abnormal usage (e.g. sleeping). In still other embodiments, the alarm initiated by control module 325 may be gradually escalated. For example, control module 325 may first cause a visual alarm to be displayed and, if the alarm is not deactivated within a predetermined period of time, control module 325 may proceed to initiate an audible alarm.

Although door sensor 450 may determine when door 500 is opened or closed, in some cases it may not be possible to determine whether a person has entered or exited vestibule 100 in response to door 500 being opened. Therefore, in some embodiments, control module 325 may determine that timer 345 should be reset in response to door 500 being opened (step 706) by analyzing the pulse-Doppler signature of the radar signal immediately before and after the door opening, since the pulse-Doppler signature will show the direction the entering or exiting person was traveling. Furthermore, the direction in which the door moves to an open position may inform door sensor 450, and in turn control module 325, as to whether a person has entered or exited vestibule 100. For example, in some embodiments vestibule 100 may comprise two doors, with one door configured to open in a first direction (e.g. inwards towards the interior of vestibule 100) in response to a user wishing to enter vestibule 100, and the other door configured to open in a second direction (e.g. outwards towards the exterior of vestibule 100) in response to a user wishing to exit vestibule 100.

In some embodiments, instead of a radar-based presence detector 250, abnormal usage detection system 1000 could use a camera (for example camera device 10 described above) for detecting a presence of a person within vestibule 100. For example, the camera (or a processor communicatively coupled to the camera) may perform video analytics on image data generated by the camera to detect the presence of a person within vestibule 100. Advantageously, the camera may determine that multiple individuals enter or leave vestibule 100 in response to a single instance of door 500 opening. In such cases, the camera may further adjust timer 345 to take into account the multiple number of individuals that have entered or left vestibule 100 in response to the single instance of door 500 opening. For example, in response to control module 325 determining that door 500 is open, the camera may determine that two new individuals have entered vestibule 100. In such a case, control module 325 may cause timer 345 to initiate a count-down that is twice as long as would be the case if a single person had entered vestibule 100.

Typical video analytics systems may fail to detect an immobile person—such a person may simply become part of the background image as they do not move sufficiently to register on a camera system; instead they are treated as immobile objects. Thus, presence detector 250 may comprise a combination of a camera and a radar detector (for example a combination of camera device 10 and sensor system 208, described above), for improved detection of a presence of a person within vestibule 100.

Immediately following the expiration of the count-down, control module 325 may be configured to allow a user-configurable cool-down period to elapse before determining that no further presence is detected within vestibule 100 (in which case timer 345 is reset) or else that a presence is detected within vestibule 100 (in which case alarm 365 is activated). The cool-down period may be useful in instances where a person temporarily moves to a position that is undetectable by presence detector 250.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A computer-implemented method comprising:
    detecting a presence of a person at a location;
    in response thereto, initiating a timer while the person is present at the location;
    after initiating the timer, detecting a change in a status of a portal able to permit physical access to the location, wherein the change in the status comprises the status changing from the portal preventing physical access to the location to the portal permitting physical access to the location; and
    in response thereto, adjusting the timer, wherein adjusting the timer comprises pausing the timer for a predetermined period of time, or resetting and reinitiating the timer while the person is present at the location.

2. The method of claim 1, wherein detecting the change in the status of the portal comprises determining that the status has changed from a closed status to an open status.

3. The method of claim 1, wherein detecting the presence of the person comprises using radar to detect the presence of the person.

4. The method of claim 1, wherein detecting the presence of the person comprises using a camera to detect the presence of the person.

5. The method of claim 1, further comprising, after adjusting the timer:
   determining that the timer has expired; and
   further detecting a presence of a person at the location.

6. The method of claim 5, further comprising, in response to determining that the timer has expired or in response to further detecting the presence of the person at the location, issuing an instruction for performing an action associated with abnormal usage at the location.

7. The method of claim 6, wherein issuing the notification comprises one or more of:
   activating a visual alarm; activating an audible alarm; and controlling a camera at the location.

8. The method of claim 1, further comprising, after adjusting the timer:
   determining that the timer has expired; and
   determining that no person is present at the location.

9. The method of claim 8, further comprising, in response to determining that the timer has expired or in response to determining that no person is present at the location, resetting the timer.

10. The method of claim 9, wherein resetting the timer comprises resetting the timer after a cool-down period has elapsed since determining that the timer has expired.

11. The method of claim 8, further comprising, after determining that the timer has expired and after determining that no person is present at the location:
   further detecting during a cool-down period a presence of a person at the location, wherein the cool-down period comprises a period of time immediately following the determining that the timer has expired; and
   in response thereto, issuing an instruction for performing an action associated with abnormal usage at the location.

12. The method of claim 1, wherein the location comprises one or more of: an Automatic Teller Machine (ATM) vestibule; a changing room; a bathroom; and a locker room.

13. A system comprising:
   a timer;
   a presence detector configured to detect a presence of a person at a location;
   a portal able to permit physical access to the location;
   a portal sensor configured to detect a change in a status of the portal; and
   one or more processors communicative with memory having stored thereon computer program code configured when executed by the one or more processors to cause the one or more processors to perform a method comprising:
      detecting with the presence detector a presence of a person at the location;
      in response thereto, initiating the timer while the person is present at the location;
      after initiating the timer, detecting with the portal sensor a change in the status of the portal, wherein the change in the status comprises the status changing from the portal preventing physical access to the location to the portal permitting physical access to the location; and
      in response thereto, adjusting the timer, wherein adjusting the timer comprises pausing the timer for a predetermined period of time, or resetting and reinitiating the timer while the person is present at the location.

14. The system of claim 13, wherein the presence detector comprises a radar device.

15. The system of claim 13, wherein the method further comprises, after adjusting the timer:
   determining that the timer has expired; and
   further detecting with the presence detector a presence of a person at the location.

16. The system of claim 15, wherein the method further comprises, in response to determining that the timer has expired or in response to further detecting the presence of the person at the location, issuing an instruction for performing an action associated with abnormal usage at the location.

17. The system of claim 16, wherein issuing the notification comprises one or more of:
   activating a visual alarm; activating an audible alarm; and controlling a camera at the location.

18. A non-transitory, computer-readable medium having stored thereon computer program code configured when executed by one or more processors to cause the one or more processors to perform a method comprising:
   detecting a presence of a person at a location;
   in response thereto, initiating a timer while the person is present at the location;
   after initiating the timer, detecting a change in a status of a portal able to permit physical access to the location, wherein the change in the status comprises the status changing from the portal preventing physical access to the location to the portal permitting physical access to the location; and
   in response thereto, adjusting the timer, wherein adjusting the timer comprises pausing the timer for a predetermined period of time, or resetting and reinitiating the timer while the person is present at the location.

* * * * *